(12) United States Patent
Inditsky

(10) Patent No.: US 7,001,058 B2
(45) Date of Patent: Feb. 21, 2006

(54) ULTRA-THIN BACKLIGHT

(76) Inventor: Ben-Zion Inditsky, 3 Nesi'Im St., Holon (IL) 58322

( * ) Notice: Subject to any disclaimer, the term of this patent is extended or adjusted under 35 U.S.C. 154(b) by 199 days.

(21) Appl. No.: 10/145,078

(22) Filed: May 15, 2002

(65) Prior Publication Data
US 2002/0172039 A1 Nov. 21, 2002

Related U.S. Application Data

(60) Provisional application No. 60/291,475, filed on May 16, 2001.

(51) Int. Cl.
*F21V 7/04* (2006.01)

(52) U.S. Cl. .................. 362/610; 362/606; 362/612; 362/625; 362/616; 362/555; 362/560; 362/561; 362/311; 362/800; 362/330

(58) Field of Classification Search .............. 362/31, 362/555, 558, 560, 561, 311, 330, 800, 606, 362/610, 612, 625, 616, 310
See application file for complete search history.

(56) References Cited

U.S. PATENT DOCUMENTS

| | | | | | |
|---|---|---|---|---|---|
| 4,915,479 | A | * | 4/1990 | Clarke | 349/62 |
| 5,375,043 | A | * | 12/1994 | Tokunaga | 362/31 |
| 5,461,547 | A | * | 10/1995 | Ciupke et al. | 362/31 |
| 5,704,703 | A | * | 1/1998 | Yamada et al. | 362/27 |
| 6,139,162 | A | * | 10/2000 | Masaki | 362/31 |
| 6,217,188 | B1 | * | 4/2001 | Wainwright et al. | 362/103 |

* cited by examiner

*Primary Examiner*—Sandra O'Shea
*Assistant Examiner*—Sharon Payne

(57) ABSTRACT

A backlight for a display device, such as a liquid crystal display device, includes a light guiding plate having a front and a rear surface. The front and rear surfaces may be parallel to one another, or may instead be non-parallel. To the extent that such surfaces are non-parallel, one surface may be included at a single, or multiple angles with respect to the other surface. The backlight further includes a light source that is coupled to an edge of the light guiding plate by means of an energy conserving coupling section, and which provides light that is conditioned and transmitted through the light guiding plate. Light extractors are disposed on at least one side of the light guiding plate to assist in the transmission and conditioning of the light that is provided to the light guiding plate by the light source.

40 Claims, 19 Drawing Sheets

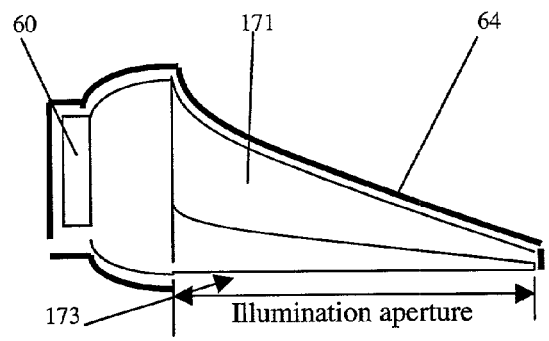
Fig. 6G
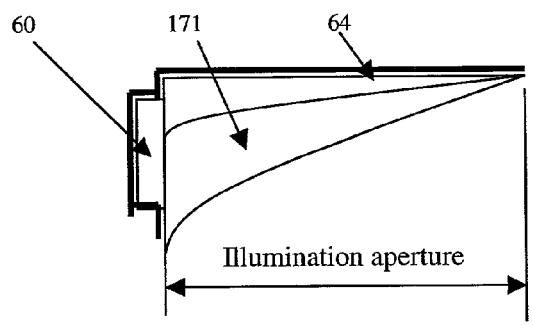
Fig. 6H
FIG. 6I
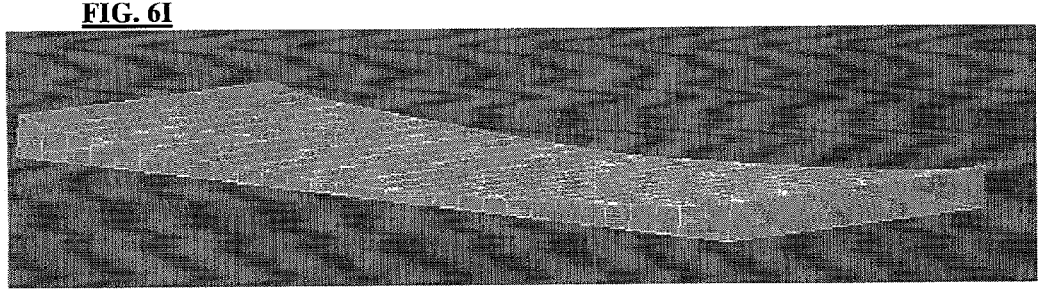
FIG. 6J
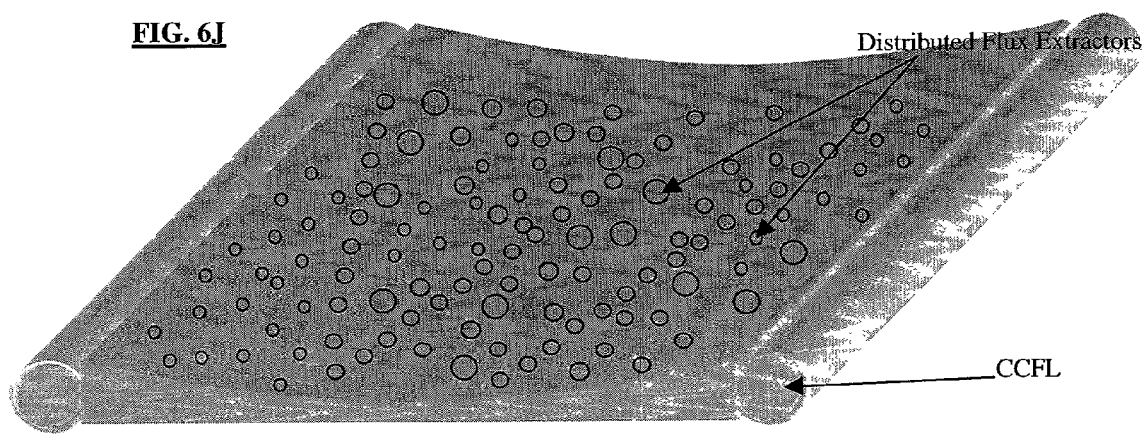

VIEW C - C

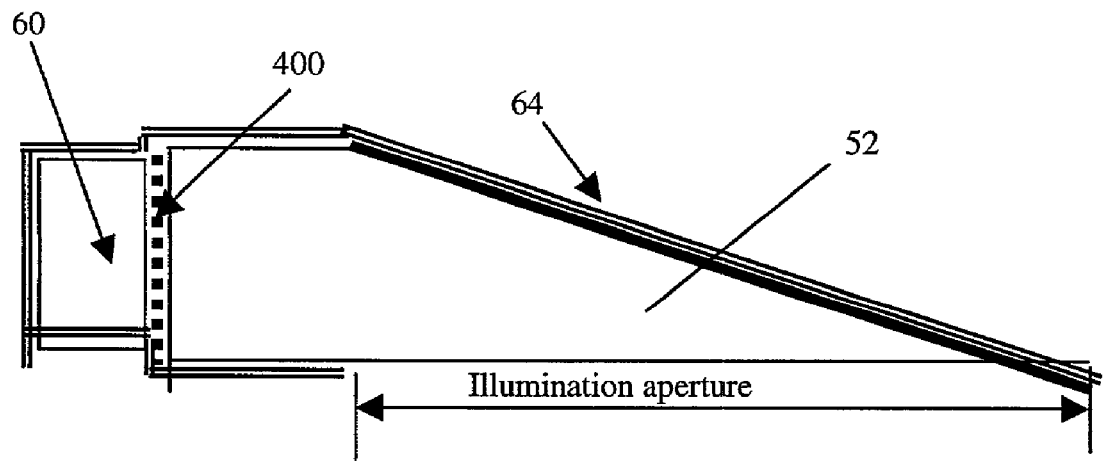
Fig. 15
Fig. 16A
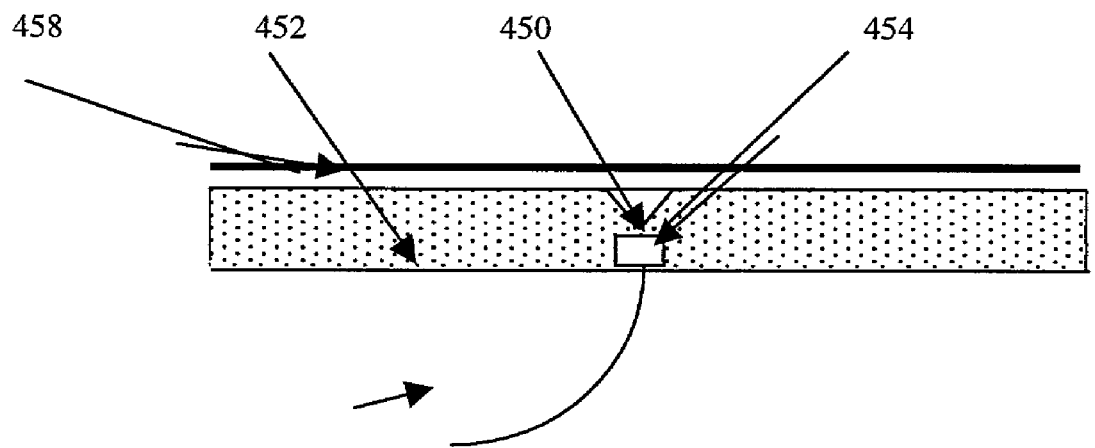

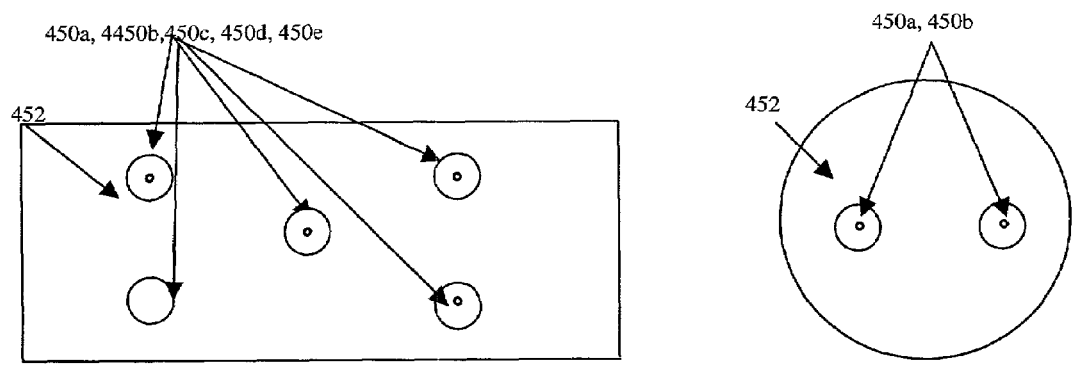
FIG. 16C
FIG. 16D
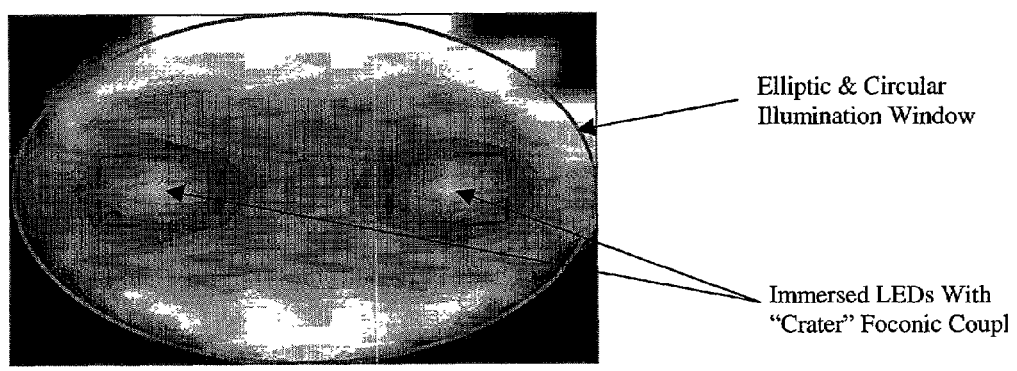
Elliptic & Circular Illumination Window
Immersed LEDs With "Crater" Foconic Coupl
FIG. 16G

ULTRA-THIN BACKLIGHT

CROSS-REFERENCE TO RELATED APPLICATIONS

This application claims priority to copending U.S. provisional application Ser. No. 60/291,475 filed on May 16, 2001, which is entirely incorporated herein by reference.

FIELD OF THE INVENTION

The present invention relates to backlights for transmissive display devices and, in particular, to thin, efficient and uniformly bright backlights based on light guiding plates for use with, e.g., Liquid-Crystal Displays (LCD).

BACKGROUND OF THE INVENTION

A prevalent class of two-dimensional electro-optical display devices, for displaying digitally provided images, is a flat transmissive device wherein the transmission at each pixel is controllably modulatable. The most common type of this class is the Liquid-Crystal Display (LCD), which is widely used in computers, especially of the portable kind, and in small display systems for viewing through ocular optics. Every such display device must be provided with a light source that illuminates its back face so that its light is transmitted across the device, while being image-wise modulated by it. This light source is commonly referred to as a "backlight". The primary requirement for such a backlight is that its brightness, as viewed from the front, is of a sufficiently high overall level, and that it is relatively uniform over the face of the display. In the case of computer displays, there is another major requirement, namely that the backlight be relatively thin—in keeping with the thinness of the display device itself and thus forming a complete display assembly whose depth dimension is appreciably smaller than any dimension of its face. In what follows any light transmissive display device will be referred to as a LCD, without detracting from the applicability of the invention to other types of transmissive display devices.

For large display devices, backlights have traditionally been constructed of an array of fluorescent tubes behind a light diffusing screen. Such traditional backlights are characterized by poor brightness uniformity and by small aspect ratio. Aspect ratio (AR) is defined as the ratio of the diagonal size of the illumination window (or illumination aperture, as it will be termed hereafter) to the maximum depth dimension of the backlight.

A more recent type of backlight—the so-called edge coupled type—employs a light source coupled to an edge of a light guiding plate (LGP), along which the light flux propagates by total internal reflection (TIR) with almost no losses. This enables constructing backlights with very large AR—typically of 50–100—for 10–20" diagonal LCDs used in existing portable and desktop computers. In these types of devices a light source, usually a cold cathode fluorescent lamp, introduces light into a light guiding plate (LGP), through an edge surface thereof. The LGP is so structured that part of the light entering through the edge radiates out through the LGP's front face. The LGP is so oriented that its front face or surface is parallel to the faces of the display device and proximate thereto, and thus light radiating from the LGP illuminates the display device and is transmitted there through. If the display device is a LCD, there is also typically disposed between it and the LGP a polarizing sheet.

Several additional components are often used to increase the brightness and uniformity of the transmitted light, these include:

a reflector behind the lamp;
reflectors behind the LGP's back face and at other edge surfaces;
one or two orthogonal oriented lenticular films in front of the LGP's front face;
a diffusing film behind the display device.

Small-aperture LCD displays, those with a display area (and therefore also illumination aperture) of 0.5" to 2.0 inches in diagonal size are commonly used for small devices such as pagers, cellular phones, digital cameras, camcorders, personal digital assistants, and especially for small head mounted VGA and SVGA displays for virtual reality systems. The ubiquitous technology for small-aperture LCD displays is the so-called flat fluorescent backlights. These are typically about 10 mm thick, weigh about 20 g, have an aperture ratio of 4:3, have uniformity (ratio of highest to lowest brightness in the aperture) of 1.6:1, and produce a surface luminance of approximately 1200 fL.

Due to its inherent compactness, ease of operation and luminance efficiency, a much more suitable type of light source for such applications (instead of fluorescent lamps) is a light-emitting diode (LED). FIG. 1A shows a prior art cavity type LED-based backlight 10 that is analogous to an integrating sphere as described, for example, in U.S. Pat. Nos. 5,892,325 and 6,134,092. The interior of the cavity 12 is typically constructed of a white diffusely reflecting material of high reflectivity (greater than 95–99%) and backed with a surface of a diffusive, reflecting material 14. The LED light source 14 is coupled to an edge of the cavity 12 and along with the cavity is disposed in a housing 18. Disposed adjacent and proximate to the front surface of the cavity, e.g., the surface opposite the surface backed with the diffusive material, are the one or more layers 20a, 20b, and 20c of brightness enhancing films (BEFs), diffusers and materials described below and unique to the different types of LCDs. Finally disposed in front of the layers 20a–20c is the image display device, namely the LCD 22

Another prior art backlight using multiple LEDs coupled to two edges of a planar LGP is depicted in FIG. 1B. The use of multiple LEDs is dictated by a need to improve the luminance uniformity, which is poor (remains below an acceptable value) with one LED in existing devices. With recently developed high flux, "Ultra-Bright" LEDs a smaller number of more efficient LEDs can be used to produce a given display luminance. A prerequisite for such a device is a maximally thin LGP-based optical architecture accomplishing significantly better luminance uniformity, which is an object of the present invention. Multiple LEDs can also be used to attain higher display luminance as is needed in high information density (high resolution) graphic LCDs for 3G wireless devices, PALMS etc.

While more compact than the previously mentioned devices, the device of FIG. 1A still suffers from several practical problems. First, the device of FIG. 1A is still very large in all dimensions with respect to the size of the illumination aperture and has the additional disadvantage of being energetically inefficient. In practice, the requirement of uniform illumination with cavital design is difficult to achieve, in particular for larger and thinner configurations, i.e., larger aspect ratio designs. Indeed, the performance of such a device imposes two conflicting requirements on AR. On one hand, to achieve brightness uniformity the AR should be small, assuring that all of the cavity's surfaces projecting through the exit aperture are uniformly illuminated by a relatively small number of multiple interreflections (MIRs) of the highly nonuniform light flux emanating from the light source. This reduces reflection losses and increases efficiency. On the other hand, the AR should be sufficiently large to allow a commercially and technically acceptable depth dimension of a device. As a result, prior art devices are bulky in terms of depth dimension and/or cannot assure an acceptable uniformity for larger displays. Typical devices require that 4<AR<10 as specified in, for example, U.S. Pat. No. 6,043,591, while analysis indicates that the achievable uniformity with such designs is only on the order of 1.3:1. While these performance criteria may be suitable for some LCD applications, they are not sufficient for applications using multi-colored LED sources, as described below, in which a uniformity between the illumination colors of 1.05:1 is required in order to prevent perceivable color shifts.

A partial solution known as a compound cavity-TIR system is described in U.S. Pat. No. 6,043,591, which suggests filling the cavity with a fluid. However, the internal reflections within the fill medium are still diffuse at all lambertian cavital surfaces, as a result of direct optical contact. In fact, only an upper surface of such filled cavity acts as a light guide, but its ratio to the total surface area of the cavity is too small to have any significant positive effect. As a result, such systems fail to appreciably improve the backlight luminance efficiency and achievable AR.

As noted above, the best solution to date for small-aperture LED-illuminated backlights would seem to be the use of a light guiding plate (LGP), which distributes the light flux by total internal reflection (TIR). However as realized herein, several practical problems inherent to such a system are compounded in the case of small-aperture LGP-based backlights. A first of these practical problems include the fact that a relatively thick planar LGP, with 1<AR<10, suffers from elevated light flux losses, since, with existing extraction means, a large fraction of the LED-injected flux inevitably reaches the opposite edge of the LGP and is coupled out on the proximal outer reflector; it is then coupled again into the LGP, travels in a reverse direction and eventually ends up on the LED, where it is totally or partially absorbed. An optimal LGP should reduce this residual flux and ensure that a maximal fraction of the initially forward propagating flux from the LED should be extracted in a first pass. Even with thinner LGPs, e.g., 1–2 mm, having optimized extractor distributions described below, the AR is still relatively small so as to make this problem significant.

Light extraction in a flat illumination device ("FID") can also be effected by using a tapered LGP the faces of which are mutually inclined at some angle THETA, thus forming a wedge, rather than a planar parallel-faced plate. As the flux from the lamp, coupled to the edge of the plate, propagates along the wedge, the angles of incidence IIHI are reduced by 2θ at each reflection from the inclined face(s). When the angle φ of any flux component becomes smaller than a critical angle of TIR, this flux is coupled out from both faces of the LGP in a number of successive reflections in a forward direction, following the Fresnel equations. The flux is extracted at the directions close to the grazing angles and some internal or external diffusing and/or concentrating elements can be used to modify the spatial luminance, or luminous intensity distribution, to satisfy the particular requirements. Some of the forward propagating flux reaching the opposite and adjacent LGP edges is eventually reflected by an external reflector into a backward path, as well as sideways skewed paths. Linear one dimensional (i.e., having constant inclination angle along one orthogonal direction) wedge-like LGPs are described in relation to a number of FIDs, in, for example, U.S. Pat. Nos. 6,104,455 and 6,259,496. However, these linear wedge shaped devices inherently produce a significantly non-uniform luminance, this non-uniformity growing with the LGP's length.

U.S. Pat. No. 5,357,405 describes a nonlinear semicylindrical concave surface which effects, in combination with additional light extracting means, better uniformity. This one-dimensional nonlinear wedge is not designed to produce uniform luminance independently. U.S. Pat. Nos. 5,303,322; 6,002,829 and 6,044,196 describe the possibility of using a one-dimensional nonlinear wedge for compensating light output irregularities for a special type of tapered multilayer devices that are very different from the FIDs under consideration. These patents fail to teach any practical solutions and in fact, the expanding convex wedges qualitatively depicted therein necessarily suffer from augmented non-uniformity as compared to linear wedges. Further, the attempt to analyze the problem using general adiabatic invariant cannot produce any meaningful solution since one has to consider the exact convolutions of Fresnel equations in three dimensional domain with complex boundary conditions, imposed by the LGP shape, and backward propagating residual flux.

Apart from reducing average thickness and bulk material, the wedge can be used for effective light extraction in the first pass and reduction of the residual flux and accompanying losses. Indeed, it directly follows from the General Photometric Invariant (so-called etendue conservation principle), that a total flux extracted from horisontal face(s) of a one dimensional wedge in a first forward pass is proportional to:

$$(Z_{max}-Z_{min})/Z_{max}$$

where $Z_{max}$ and $Z_{min}$—are respectively maximal and minimal thickness of the wedge.

A second practical problem resides in the fact that in order to attain high illumination uniformity, light extraction from the LGP's internal flux should be nonuniform. In relatively large backlights, illuminated by extended tubular lamps (such as cold cathode fluorescent lamps), the extractors' density distribution over the face of the LGP should be greater the further away they are from the source. This is illustrated in, for example, U.S. Pat. Nos. 5,283,673; 5,796, 450; 5,949,505; and 5,896,119. Indeed, flux density inside the LGP having some extractor means is generally not uniform and diminishes gradually with increasing distance from the light source. Thus, if the extractors were to be uniformly distributed over the face, extracted light intensity would likewise vary across it. In order to overcome this phenomenon, the extractor elements in prior art devices are distributed non-uniformly, being more sparse near the lamp and more crowded near the opposite edge. Light extractor areas are characterized by a cover factor (CF), representing a ratio of extractor area to an elementary unit area, located anywhere within a light extracting face(s) of an LGP.

A third practical problem related to the fact that an efficient coupling architecture is required to take the light emitted from a LED source and inject it efficiently into a thin lightguide. LEDs with conventional primary optics (lens-like or flat shaped epoxy encapsulants in direct optical contact with the LED emitter and/or reflector cup) suffer from very significant losses due to Fresnel retroreflection of initially emitted flux. This phenomenon takes place during the passage of radiation at the interface between the LED emitter (N=3.5–3.7) and the encapsulant (N=1.5–1.6) and at the interface between the encapsulant and air. Similar losses also occur for LEDs with a cup-shaped or cup reflector surrounding the emitter. In the latter case some of the flux reflected by such a reflector reaches an emitter or strikes an encapsulant-air interface at large angles causing an augmented retroreflection. Most of the thus retroreflected flux is absorbed in the LED, causing output losses and eventual elevation of LED chip temperature, which reduces the LED's luminous efficacy. This is a problem as current LED backlights only have optical efficiencies in the range of 50–75% and uniformity typically in the 1.3–1.4:1 range.

The discussion so far has not included the subject of color. This subject is important even for monochromatic displays. In fact, because of their inherent spectral characteristics, the use of LEDs makes white illumination problematic, but at the same time may also provide advantages when applied according to the present invention, all as described herein below.

A typical "white" LED, made by Nichia, Ltd. consists of a bright blue LED covered with a yellowish phosphor coating. This backlight has approximately the same dimensions as the flat fluorescent type (described above), weighs about 8 g, has a uniformity of about 1.4:1 and emits 1500 fL. Any backlight that uses a white lamp as the light source, including the above-mentioned white LED, has an important drawback, namely that the spectrum of the emitted light is fixed and is determined almost solely by that of the lamp. This, in turn, determines the absolute color of the display, if monochromatic, and of white portions (and consequently also of other portions) of a displayed color image, which color is also known as the "white point". In many applications, whether for monochrome or for color displays, it is important to be able to control the white point. In the aforementioned conventional type of backlights such a control is very difficult, in that it can only be accomplished by carefully selecting the lamp or by interposing suitable correction filters. Moreover, the white point may change with the life of the lamp.

To display color images, the common practice is to employ a transmissive display device, such as an LCD, in one of several different arrangements. A first arrangement includes an array of color filters, usually of the three additive primary colors (red, green and blue), congruent to a suitable array of light modulating elements, or pixels. In this first arrangement, known as a filter-array arrangement, A backlight, such as described hereabove, is employed for such a color LCD in much the same manner, as long as the spectrum of its emitted light is broad enough to include the transmission spectra of all the filters. In operation, the light transmitted through any modulation element of the LCD, is spectrally filtered by a corresponding filter; all elements corresponding to red filters thus form the red component image and the green and blue components are similarly formed. Because of the small size of the elements, relative to the resolution of a human eye, the three images combine in the observer's eyes into a continuous full-color image.

This practice has several major drawbacks. First, appreciably less than one third of the light energy emitted by the backlight is transmitted by each filter and thus the apparent brightness of the display, even in white areas of the image is considerably lower than it would have been with a monochromatic LCD device, given the same lamp intensity. In other words, the display efficiency is considerably reduced. A second drawback is that color-filter-array type LCDs has relatively high cost of manufacturing due to the intricacies of the manufacturing process. A third drawback relates to the fact that, for a given pixel resolution, the basic LCD resolution must be at least three times higher (per unit area). This last drawback has become a particular liability in the case of small-aperture display devices, especially as they simultaneously strive for higher resolution, which correspondingly puts a premium on pixel real estate, while requiring even more pixels in the shrinking space.

A second arrangement, known as Color Field Sequential Imaging (CFSI) method for transmissive color displays is also known in the art. This second arrangement basically consists of a monochrome LCD and three light sources, each of a respective primary color, illuminating its back. Signals corresponding to the three primary-color component images are applied to the LCD sequentially, in a regular cycle. Synchronously with the application of each such component a corresponding one of the three light sources is switched on so as to illuminate the LCD while it image-wise modulates the transmitted light according to the corresponding color component. All three color components are thus sequentially displayed for each frame of video and therefore their rate is three times the regular video rate (e.g. 180 Hz). Because of the image retention characteristics of the human eye, all three components are effectively merged into a single full-color image corresponding to the respective video frame.

A sequential color display type, such as described herein, inherently overcomes the three drawbacks of filter-array display type devices as they allow practically all the light energy that is applied to the LCD over white areas of the image to be transmitted. Further, the LCD itself is a monochromatic type and thus relatively inexpensive both in terms of components and in terms of the manufacturing process. Finally, the relative intensities of the three light sources may be adjusted so as to achieve any desirable white point.

In order to illuminate the above-mentioned sequential color LCD, a backlight with the ability to iterate quickly enough between the three basic colors is needed. This is provided by a LED-based backlight architecture, using very bright red, green and blue (RGB) LED's to create uniform fields of sequential RGB light. Since LED's can switch on and off in 15 nanoseconds, they can succeed in this application, whereas RGB fluorescent lights cannot because of the long fluorescent decay times between successive on/off states of the RGB phosphors. LEDs also inherently possess the desirable characteristics of maximum color saturation and high photonic efficiency. According to prior art, LEDs cannot, however, be practically used to illuminate the edge of a LGP to serve as a backlight, because each is, in effect, a point source of light (as opposed to the elongated format of the light emitted by CCFLs), which causes the resulting pattern of light flux emitted from the face of a typical LGP to be highly non-uniform. Therefore, in most prior art backlighting devices, LEDs are positioned in back of the LCD, and not coupled along an edge.

A typical prior-art arrangement, with three LEDs positioned in the back of a diffusing/redirecting screen 30, and enclosed in a housing 34, is shown schematically in FIG. 1C. The LEDs 32 are at a considerable distance from the screen 36, in order to minimize the non-uniformity of illumination over the screen due to the varying distances from the sources. The device 30 typically will further include one or more films or lenses for conditioning the light emitted from the LED. In this case, a Brightness Enhancing Film (BEF) 36 and a diffuser 38 show a typical arrangement. Such prior-art type of colored backlight has a major disadvantage of having a very large depth dimension, contributing to bulkiness of the entire display device. Further disadvantages of such prior-art devices are that the LEDs themselves have a non-uniform radiation pattern, which further contributes to the non-uniformity of the backlight, and that the three LED sources must still be placed at some mutual distances, which causes non-uniformity in the hue of white over the display, as discussed above. U.S. Pat. No. 5,892,325 to Gleckman discloses a backlight comprising a diffusive reflective cavity, which is illuminated from its side, in one configuration—by a plurality of red, green and blue LEDs. This device, however, suffers from the disadvantages already discussed above.

Thus, there exists a need for a backlight for LCDs that provides the advantages of colored LEDs while addressing the limitations inherent is such arrangements. Such a device must be able to monochromatically or color-sequentially illuminate a monochromatic LCD, and have attributes including:

Uniform luminance over the entire illumination aperture;
Uniform color over the entire illumination aperture;
High brightness efficiency in utilizing a given light source; and
Compact overall dimensions and a thin structure.

Preferably the backlight should use LEDs and light-guiding components and also be inexpensive to manufacture.

BRIEF DESCRIPTION OF THE FIGURES

FIG. 6G illustrates the same embodiment of FIG. 6F with a focon between the LED and the entrance face of the LGP, in accordance with an embodiment of the instant invention;

FIG. 6H illustrates the LGP of FIG. 6E with the illumination area on the flat face of the LGP, in accordance with an embodiment of the instant invention;

FIG. 6I illustrates another view of a wedge type LGP with multiple LEDs coupled to its opposing edges, in accordance with an embodiment of the instant invention;

FIG. 6J illustrates a wedge type LGP with two CCFLs coupled to its opposing edges, in accordance with an embodiment of the instant invention;

FIG. 15 illustrates an embodiment in which a diffuser layer is interposed between the LED and the LGP, in accordance with the invention.

FIG. 16A illustrates a vertical foconic "CRATER" coupling section, in accordance with the instant invention;

FIG. 16C illustrates a rectangular LGP with multiple "crater" coupled LEDs, in accordance with an embodiment of the instant invention;

FIG. 16D illustrates circular/elliptic LGPs with multiple "crater" coupled LEDs, in accordance with an embodiment of the instant invention ention;

FIG. 16G illustrates CF distribution for a circular & elliptic LGP with two "crater" coupled LEDs.

DETAILED DESCRIPTION OF THE INVENTION

Figure 1A:
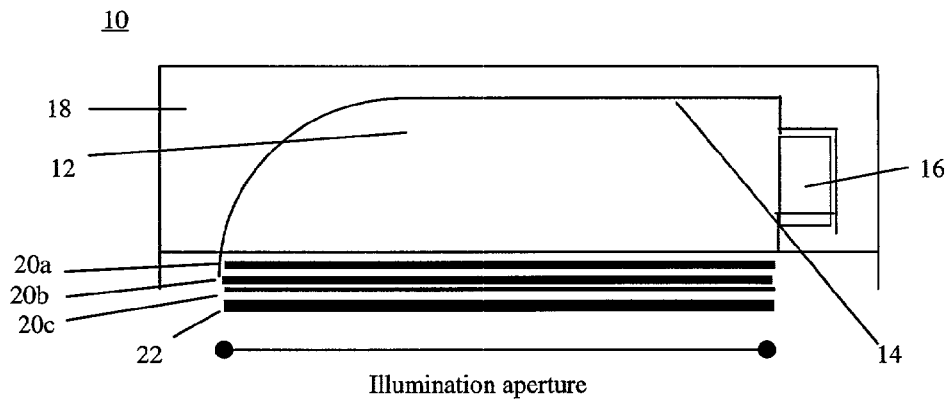
FIG. 1A illustrates in schematic form a prior art optical cavity made of a light reflective material and a plurality of light influencing films.
Figure 1B:
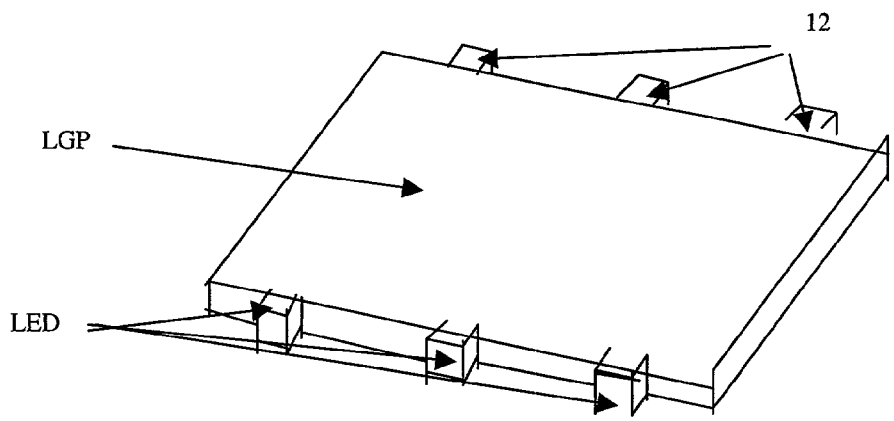
FIG. 1B illustrates in schematic form a prior art light guide plate with light sources along the side surfaces thereof.
Figure 1C:
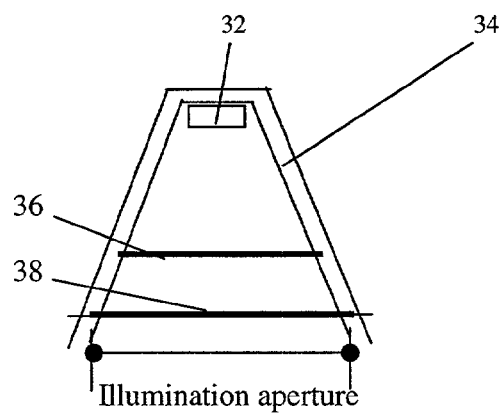
FIG. 1C illustrates a prior art backlight with an LED behind the illuminated area.

While the specification concludes with claims defining the features of the invention that are regarded as novel, it is believed that the invention will be better understood from a consideration of the following description in conjunction with the drawing figures, in which like reference numerals are carried forward.

The instant invention has addressed the many problems identified in the prior art. Specifically, the inventive, specially shaped linear and non-linear wedge-like LGP described hereinbelow, having varying angle, reduce the mentioned efficiency losses and obtain better luminance uniformity, simultaneously reducing a weight and profile of the complete display device. As will be readily apparent from the following description of the preferred embodiments thereof linear wedges have to be complemented by additional light extraction means to improve the uniformity. It is yet another object of this invention to provide improved wedge shaped one- and two-dimensional LGPs with variable nonlinear tilt and curvature variation along one or two spatial dimensions enabling to maximize the flux extraction efficiency and luminance uniformity while minimizing the LGP's weight and bulkiness, as depicted below in, e.g., FIG. 6A.

Moreover for an LGP and in particular one of relatively small (e.g., 0.25"–2") diagonal size, with a LED or any other point-like source, the distribution of LGP's internal flux density has a pronounced irregular non-monotonic pattern due to the presence of a considerable flux component, which escapes through the exit aperture after multiple interreflections (MIR's) on all LGP's surfaces. Thus, the initial flux density may be of smaller value near the source and increase with an increasing distance from the latter. Accordingly, the suitable distribution of extractors is very different from that in existing LGPs. In particular, it is preferable that the distribution of extraction areas (extractors) over the respective face of the LGP is generally non-uniform along both dimensions, having a relatively low Cover Factor (CF) over LGP areas where the internal flux is strong, and relatively high CF over areas where the internal flux is relatively weak.

The novel CF distributions that will be described hereinbelow in the detailed description have special irregular patterns found by a numerical iterative procedure, which ensure both very high degree of luminance uniformity, and maximal theoretically obtainable flux extraction efficiency. These novel CF distributions, apart from ensuring very high degree of luminance uniformity, are also unique in another aspect related to their light extraction efficiency. As mentioned above, to the extent that not all the light is extracted from the flux during its initial pass through the LGP, the residual flux traverses the plate a multiplicity of times and thus is increasingly subject to losses. In the prior art devices CF varies within a compressed (restricted) range of values with $CR_{max} < 1$. Such a design is easier to produce, since it is less sensitive to a CF distribution of extractors. However, the penalty for such reduced values of CF is a reduced extraction factor and, as a result, larger residual flux and accompanying efficiency losses. The CF distributions of extractors described below have the highest possible values, which assures highest output efficiency, while maintaining the required uniformity of extracted flux.

In order to better understand the instant invention, a preliminary discussion of flat illumination devices ("FID") may be helpful. An FID is a non-imaging optical system, which in contrast to imaging optics requires a computation of radiation transfer and flux density distribution over all surfaces of complex multi-element systems. These systems are often characterized by extended light sources with given spatial luminance distribution, special element shapes and material optical properties which can only be described numerically, scattering on rough surfaces and in turbid LGP materials, and the presence of multiple branching interreflections (MIRs). In view of the difficulties inherent in such computations, computer simulations are useful in calculating an effective solution. Light transfer in light pipes can be comprehensively simulated only by special methods of non-imaging optics.

A commercially available software package known as KEREN from VISUS, Ltd. has provides a tool by which an analysis of non-imaging systems for lighting and other photonics applications can be accomplished. The software performs a nonsequential "Monte Carlo" forward ray tracing, which enables a complete radiometric analysis of any realistic system. However, the design of an FID system goes well beyond an analysis (e.g., a prediction of the flux transfer in a system with a given CF distribution) and involves system synthesis, i.e., finding a CF distribution, ensuring a uniform or any required luminance distribution over LGP face. This can be done in a number of successive iterations, whereby the initially selected CF distribution is modified using the comparison between intermediate and required luminance distributions. An example of such a synthesis is contained in U.S. Pat. No. 5,949,505. However to those skilled in the art it is clear that there are an infinite number of solutions belonging to a solution hyperplane. However, there is generally only one optimal solution ensuring a flux extraction with minimal losses. Such a solution should minimize the residual flux and the mean pass length of photons inside LGP before being coupled out. It is postulated that this precondition is fulfilled by maximizing local and mean CF values and/or a number of other distribution parameters, introduced below, so that a possibly higher fraction of the internally propagating flux is extracted in a first forward flux pass. In order to find such a solution two conditions should be fulfilled:

(1) The initial solution should belong to the hyperplane leading to the optimal solution. The initial CF distribution should have possibly higher values, which, however, should not produce too high non-uniformity; and (2) The iterative algorithm should assure a graceful and fast convergence to the optimal result. Accordingly it searches for a maximal value of CF at each point, such that the required luminance at this point is not exceeded in the first pass of the flux from the coupled lamps. An imposition of this boundary condition calls for a much more elaborate solution algorithm and numerical methods, as any deviation from the required luminance cannot be corrected in subsequent multiple flux passes, as is a case for suboptimal solutions.

These values are preferably computed in an iterative process, where at each iteration, a certain CF distribution is assumed, the resultant brightness computed and then compared with the desired (e.g., uniform) distribution, the differences are converted to correction factors, the latter are applied to the previous CF distribution and the process repeated until all differences are smaller than a given tolerance value. To assure a graceful convergence of the iterations to an optimal solution the correction factors are derived from the relationships describing the radiation transfer in LGP.

In order to describe more comprehensively the fundamental invariant properties of optimal CF patterns for a variety of light source, LGP shapes and optical characteristics of light extractors one can use, in addition to their mean values, higher central moments of the distribution, namely, second and third moments, which are determined by Probability Density Function (PDF). The latter are known as variance (standard deviation) and mode and are used for analysis of random variables in probability theory. While extractor CF is not a random variable these moments provide a useful mathematical apparatus for analyzing their properties.

Based on the foregoing, one can make a number of conclusions:

1. Optimal distributions result in better luminous efficiency, in particular for small extraction factor of extractors and/or small aspect ratio of an LGP.
2. The thinner is the LPG (larger AR) the larger the luminance non-uniformity over the display window, requiring more elaborate CF control. The present technique enabled to reach good uniformity with ultra-thin LGPs thinner by a factor of 2 to 10 compared the dimensions of the lamp. The latter has not been possible with the conventional extractor design; in most existing devices the LGP's thickness is at least equal or larger than that one of the lamp.
3. PDF of CF distributions with higher mean value have higher variance parameter, signifying the need for more accurate design technique.
4. Optimal distributions can be specified by several (fundamental) parameters, namely, maximal mean CF averaged over the whole light extracting face, maximal emitting area with CF=1 (continuous extractor), maximal value of variance, (i.e. by maximal range of CF variation between its maximal (unity) and minimal values) and/or by at least one area with CF=1.
5. Large variance is usually (but not necessarily) is a result of sharp spatial gradients of CF pattern over LGP face. In existing backlights such gradients cause poor uniformity and suboptimal solutions with smoothed distributions have been proposed to produce better uniformity (U.S. Pat. Nos. 5,751,386; 5,796,450) at an expense of a reduced output efficiency.
6. Optimal distributions are generally not symmetric (with respect to its mean value) and are skewed towards larger (negative mode) or smaller values (positive mode).

These fundamental properties of optimal CF extractor distributions hold for any extraction technique (screen printing, roughening, etching etc.), any lamp type (point-like—LEDs, extended, linear lamps—CCFLs etc.), and any LGP configuration and size.

Figure 2A:
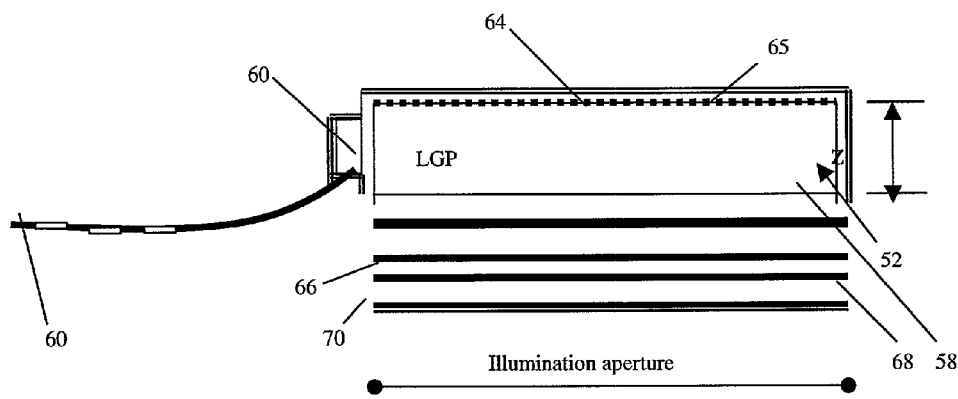
FIG. 2A illustrates a planar LGP with 2D distributed light extractors enclosed inside the reflective housing, in accordance with the instant invention.

Referring now to FIG. 2A, there is illustrated therein a first embodiment of a backlight 50 according to the present invention, in which a planar light guiding plate (LGP) 52 includes light flux extractors 54 disposed along one face 56 of the LGP, and operative to cause essentially uniform radiance from the opposite face 58 of the LGP. The LGP 52 is disposed generally parallel to the illumination aperture.

The backlight 50 further includes at least one light source 60, which may be a LED, disposed near or along an edge of the LGP so that most of the emitted light flux enters the LGP and travels across it by total internal reflection (TIR). The backlight 50 also includes electrical drive circuitry, represented generally as a series of resistors and other components 62. The electrical drive circuitry 62 is connected to the light source 60 and is capable of accurately controlling its intensity and its on-off timing. The backlight 50 may also optionally include a reflector 64 consisting of, for example, a layer of reflective materials disposed behind the LGP. An additional element that my be included with the backlight 50 is the presence of one or more brightness enhancing films (BEF) 66, 68, and 70 disposed, e.g., in front of LGP face 58, and or along one or more of its edges. BEFs redirect emitted light into a narrower angle of view, which has the effect of increasing the apparent brightness of the backlight, as viewed normally to its face, and all are known in the art. The entire assembly of the backlight, including the light sources and any optional reflectors and transmitting films, may be formed as an airtight assembly as is described in greater detail herein below with respect to, e.g., FIG. 9F, in order to prevent humidity and pollutants in the air from damaging the surfaces of the LGP.

The light source 60 is preferably a commercially available high brightness Light Emitting Diode (LED) device. For color displays it may contain several, and most typically three individual light emitting diode dies in one small package. The LED dies emit light in, respectively, the red, the green and the blue regions of the spectrum. The three diodes form, on a face of the device, respective emitting regions, each having a small size, and typically on the order of 0.3 by 0.3×0.2 mm, which, moreover, are very closely spaced. The orientation of the die relative to one another is illustrated in greater detail herein below with respect to, e.g., FIGS. 4A–4C. The mutual closeness of the light emitting regions contribute to color uniformity over the front face of the backlight, due to the near identity of the paths of the respective light fluxes through the LGP. However, the minimal distance between the various LEDs is limited by their mounting layout in their package(s) and by considerations of LED output efficiency. In the case of multiple dies in a single package, if they are spaced too closely, a considerable fraction of the emitted flux is intercepted and absorbed by adjacent dies. This adds another challenge to the design of the LGP, as it has to assure a uniform luminance for each of the individual colors in order to preserve a color uniformity over the whole exit aperture. If only a monochromatic, e.g. green or white, backlight and no tight control over its apparent color is needed, a single light source, emitting in the appropriate spectral band, may suffice. For white illumination, the "white" LED device described above may be used.

When the backlight is used in conjunction with a color sequential LCD, which is one operational mode of the invention, the light sources should have the ability to be switched on and off at a fast rate, to form short light pulses, so that light of any one color illuminates only the corresponding field of the image. Any overlap between primary colors in the illumination will cause desaturation of the apparent colors in the image, and possibly other color distortions. For a display frame rate of 72 frames per second, which is a high yet common rate for computer displays, three-color sequential fields will have to be displayed at a triple rate, namely 216 fields per second. This prescribes that the light pulses have durations of less than 5 milliseconds. Preferably the pulses should be somewhat shorter, in order to allow for the switching time between image fields in the LCD.

Although LEDs are used in the preferred embodiment, other switchable and spectrally distinguishable light sources may be used as the light source 60 in the context of the present invention. Examples include cold-cathode fluorescent tubes with short-persistence phosphors, and which emit either appropriately colored light (i.e. in certain spectral bands) or white light, which is then appropriately color filtered. LEDs have, however, the advantages of (a) having very narrow emission spectra, thereby enabling the widest color gamut in the illumination and thus in the image, (b) the ability to be very closely spaced, as discussed above, (c) rapid light pulsing ability, (d) stability of electro optic characteristics and (e) simple electrical drivability.

As explained above, a group of light sources, each source with its characteristic spectrum (forming a primary color), which together can effect white illumination, should be disposed as close to each other as possible. Such a group will be termed a set of sources. A set of sources can consist of a single device with multiple LED regions, as in the preferred embodiment, or of an assembly of individual LEDs or other light sources. If high display brightness is desired, a plurality of sets of sources may be employed—disposed near other portions of the edge of the LGP or near other edges. In one operational mode of the invention, the minimum number of light sources in a set of sources is three, namely one for each conventional primary color. A set of sources may, however, include more than three. For example, in some cases it may be desirable to have four (or more) primary colors, in order to increase the color gamut of the displayed image. As another example, it could be that the light emission intensity of the variously colored sources, for any given drive current, may be considerably different; in such a case it may be desirable to employ a commensurate plurality of sources of the less intense type.

The electrical drive circuitry 62 is designed to provide pulsed electrical currents to each individual light source, such as to affect the required light pulses, discussed above, in synchronism with the display fields in the LCD. It also includes the capability to controllably vary the intensity (i.e., amplitude) and to the extent possible the duration of such pulses. This control capability may be used to vary the brightness of the illumination and its color balance or white point. In one embodiment this circuitry is built on a flexible substrate, on which also the multiple-LED device is mounted. The design and implementation of such a circuit are well known in the art.

LEDs, as described herein, are very stable; that is, the ratio of their emission intensity to the drive current, as well as their spectral characteristics are constant over their lifetimes. This obviates the need for periodic calibration of the backlight. However, the characteristics vary among manufactured units of any one type thus requiring an initial calibration during the manufacture of the backlight. An optional feature of the invention is an inexpensive means for such a calibration, as follows: There is provided in the drive circuit for each LED a variable electronic passive or active component—preferably a resistor in series or in parallel (depending on the properties of the power source) with the LED. More preferably this resistor is variable once by physically trimming it; most preferably the trimming is done by means of a laser beam. The one-time backlight calibration procedure is then preferably as follows: Each set of sources (or the one, if single), in turn, is driven by its normal driving currents and the color and intensity of the resultant illumination flux is measured by one or two suitable instruments, such as a spectrophotometer or a photometer and a colorimeter. Corresponding resistors are then gradually trimmed until the specified color and intensity are reached.

Switching of the individual light sources, and controlling of their brightness (if necessary), is being done by a control unit (not shown), which is known in common practice. The control unit also serves to synchronize the specific on time of each color light source with the drive of the sequential LCD. It should be noted that the above description does not limit the number of the light sources present in the backlight, and more than 3 individual light sources can be used, such as an RGB LED with red green and 2 blues, 2 RGB LEDS or more.

In yet another embodiment of the invention, the backlight 50 is assembled together with an LCD device. In this case, a polarizing filter is typically placed between the LGP and the LCD.

In a second operational mode of the present invention, the backlight is used to provide light to a display that is not of the sequential-color-fields type but is rather fixed or slowly varying or occasionally switched, illumination of variable colors or with a constant controllable color. An example of the latter is a white color with a given correlated color temperature, which can be varied in a broad range of 2,500–20,000 K. This operational mode is generally similar to the first operational mode described above, except that in this case there is much less restriction on the response time of the light sources and on the timing of the drive circuits and that the minimum number of light sources of different spectra (i.e. primary colors) in a set of sources may be two. The various illumination colors would then be obtained by suitably controlling the driving currents. One simple way would be to provide continuous currents to the light sources and to vary their magnitudes, differentially for the various primary colors. Another way to control illumination color is to drive each light source, it preferably being a LED, with current pulses (which in this operational mode may overlap) and to differentially vary their amplitudes and/or duration. The appropriate parameters would then be provided from some external control means (not shown). In a third operational mode a single white or color LED chip is used to provide continuous lighting with a constant color.

Figure 3A:
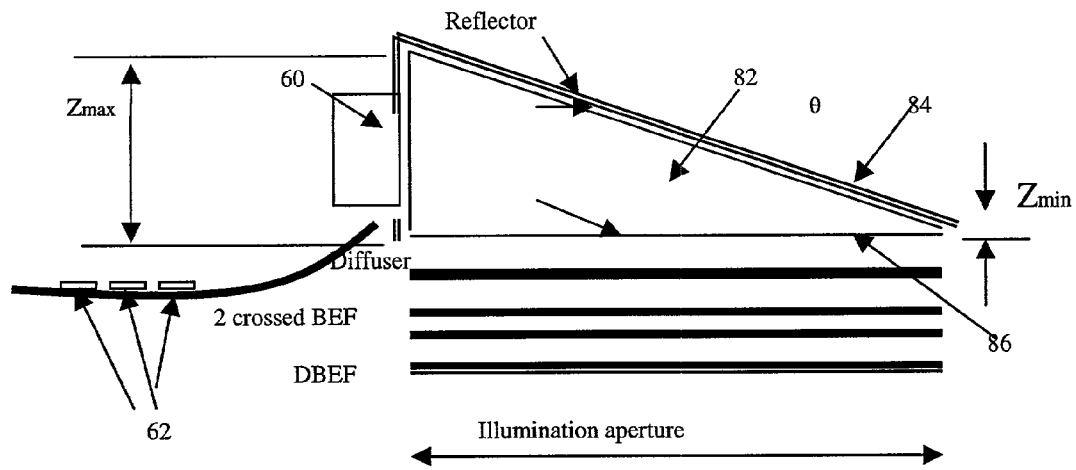
FIG. 3A illustrates a wedge shaped LGP with 2D distributed light extractors enclosed inside the reflective housing, in accordance with the instant invention.
Figure 3B:
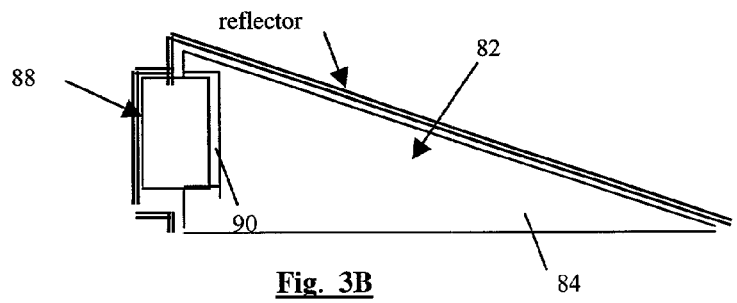
FIG. 3B illustrates an apparatus similar to the one described in FIG. 3A, in which the light source is positioned in a recess in the face of the LGP.

The light guiding plate (LGP) 52 is a plate or block of dielectric material, such as glass or plastic transparent material with a refractive index of 1.3<N<3.6 (typically 1.5, preferably 2.2), with preferably polished coupling edges, and is operative to keep a considerable portion of any light flux that enters through any of these edges flowing through it by total internal reflection (TIR) from all its faces. It may employ any means known in the art for causing part or all of this internal light flux to be extracted and emitted through its front face 58. One such means is illustrated in FIGS. 3A and 3B, where a backlight 80 includes an LGP 82 that is formed into a wedge shape with an inclined back face 84 and a front face 86 which is disposed parallel to the illumination aperture. In all other respects the backlight 80 is the same as that illustrated and described with respect to FIG. 2A. A further refinement is however illustrated in FIG. 3B which illustrates an LGP wherein the light source is coupled in a recess 90 formed into a surface of the LGP. In another variant of the backlight of FIG. 3A, illustrated in FIG. 3B, a recess is formed in the light entrance edge of the LGP, and the LED is glued inside it with a suitable adhesive, which should be transparent, and with a refractive index close, or preferably equal to the refractive index of the LGP material. The LED could also be placed inside the recess without the adhesive, and held in place by other means, such as mechanical fasteners. Such a recess contributes to greater efficiency in the coupling of light from the LED to LGP.

Figure 2B:
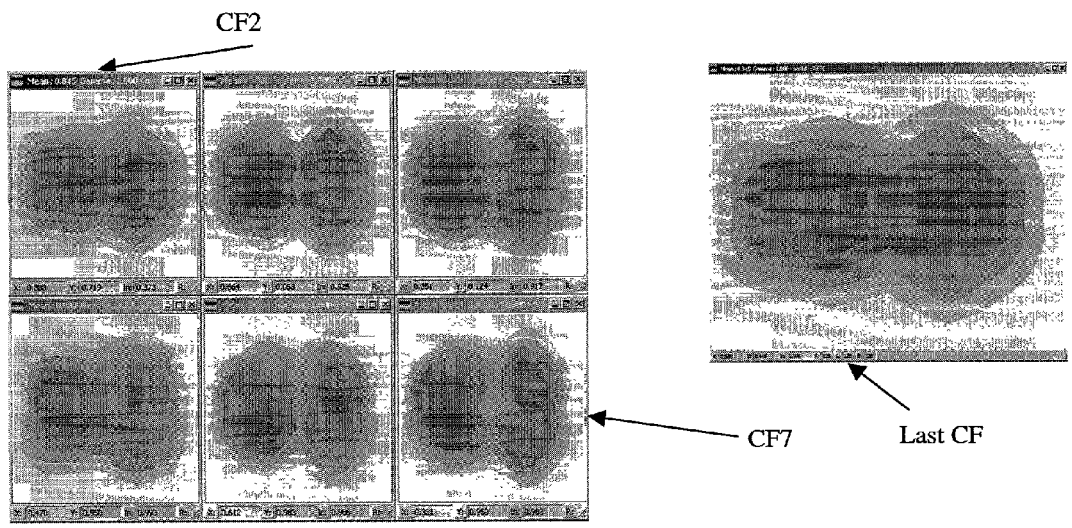
FIG. 2B shows the shape of the 2D distributed light extractors on the planar LGP of FIG. 2A.

Another way to enhance flux extraction is by partial roughening or coating of either face of the LGP. Partial roughening or coating of a face produces small areas of what is known as flux extractors, e.g., light flux extractors 54 of FIG. 2A. As noted above, light extractors are characterized by a cover factor (CF), as averaged over any unit area. An example of a CF plots over the face of an LGP, such as in FIG. 2A, is given in FIG. 2B. FIG. 2B shows a succession of intermediate sub-optimal solutions starting with CF 2 as described hereabove leading to an optimal CF pattern (CF7). A variable distribution of CFs over the aperture may be effected by a suitably designed pattern of extractor areas on one or both faces of the LGP. Yet another means for light extraction from a LGP is to employ a weakly forward scattering plastic material dispersed within the LGP. The forward scattering material also minimizes the backscatter from surface extractors in the direction of the light source, which is inherent for some type of extractors (diffuse paint etc.).

Any combination of the light extractors as outlined above, is also possible. All these must, however, be so designed or distributed over the respective face that the density of the light flux and the corresponding luminance, resulting from the light sources and emitted through the exit aperture is as uniform as possible, in order to achieve uniform apparent brightness of the resultant display (or be as close as possible to any required luminance distribution). In addition, the design of the LGP, of its surrounding and of the means for coupling light into it (from the LEDs) and out of it (to illuminate the LCD) must be such as to be highly conservative of the light flux, i.e., to have maximal possible flux throughput efficiency (in terms of the ratio of light flux emitted through the illumination aperture to the total flux emitted by the light sources).

To achieve the stated goal of illumination uniformity and of light efficiency, a variety of configurations and embodiments of the LGP, of its housing and of the light source-to-LGP coupling are described in what follows. It is noted that none of the designs and configurations rely on heavily diffusing screens between the backlight and the display device nor on a so-called reflective cavity (used in prior art devices, such as in FIG. 1A) to achieve uniformity and, in fact, do not use a reflective cavity at all (since it is generally very lossy).

Referring again to FIG. 2A there is schematically illustrated therein, a backlight 50 that comprises a planar LGP 52, of thickness Z. The light source 60, preferably an integrated LED, is attached to one side edge of the LGP and light is emitted from the LGP through a front face 58 and onto an Illumination Aperture. The emitted light preferably passes through a plurality of BEFs 66, 68 and 70, such as two crossed BEFs, having micro-prismatic profile, and a Double Brightness Enhancement Films (DBEF, which is a polarizer that reflects light of the wrong polarity into the backlight so as to re-emerge unpolarized); all these films, adding to uniformity and to brightness, are known in the art and are not features of the invention. A diffusing film can also be optionally added.

On the back face 56 of the LGP are distributed light extractors 54, acting to extract a portion of the internal flux (otherwise propagating inside the LGP by TIR) into the LGP's exit aperture (the Illumination Aperture). As used herein, the terms "extractor" "light extractor" or "flux extractor" will refer to the optimally designed extractor prepared by the iterative process described hereinabove. The light extractors are formed on the face by roughening, laser or chemical etching, embossing, forming an array of multiple molded microoptical profiles or by screen printed diffuse paint layer according to a pattern, such that the distribution of extraction areas (extractors) over the respective face of the LGP is generally non-uniform along both dimensions, having a relatively low Cover Factor (CF) over LGP areas where the internal flux is strong, and relatively high CF over areas where the internal flux is relatively weak. The CF usually increases gradually and monotonically with distance from the light source, but in devices with small aperture ratio (AR) the change in CF with distance may also be non-monotonic. While maximal CF values are located at the areas both most proximal and distant from the source coupled at the middle of the left edge of an LGP, minimal values of irregular shape and size are located around the center. Other special CF distributions can be obtained for other LGP's size and/or source(s) coupling architecture. The back face and all the edges of the LGP are covered by reflective means, to reflect back any portions of the flux that are emitted through these surfaces; the reflection may have any directivity—from diffuse to specular. This reflected flux eventually finds its way through the exit aperture after a number of multiple inter-reflections.

In one preferred embodiment of the invention, the inclined back face 84 of light extraction is employed, as depicted schematically by the shape of the LGP in FIG. 3A. The LGP has, in effect, a wedge shape for which the depth of the thin edge, $Z_{min}$, is much smaller than that of the thick edge, $Z_{max}$, that is: $0<=Z_{min}/Z_{max}<<1$, whereby $Z_{min}$ is preferably close to zero. Here, the thick edge is the one through which light enters from the light source such as an LED device. A wedge shaped LGP minimizes the residual flux, by forcing all light to be emitted prior to reaching the far (thin) edge; it has the added advantage of reduced average thickness, thus enabling a device of reduced weight. Since the back face 84 is inclined, a more compact housing is possible, by adhering to that back face. The angle between the faces of the LGP, i.e. wedge angle THETA is in the range of 0<THETA<48.degrees, preferably 0<THETA<30.degrees.

Figure 5A:
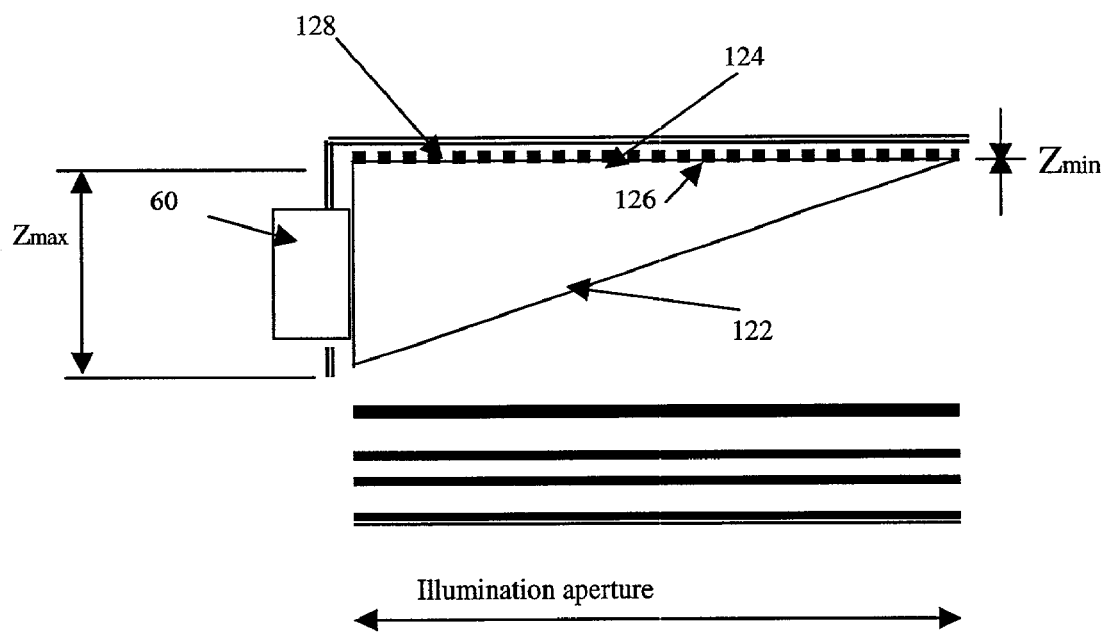
FIG. 5A illustrates an LGP with a wedge face facing the exit aperture and extractor means applied to its back face in accordance with an embodiment of the instant invention.

As shown in FIG. 5 and in particular FIG. 5A there is depicted therein a configuration similar to that of FIG. 3A.

The back light 100 includes an inclined back face 102 having a special pattern of extractors 104, whose CF is distributed so as to cause the extracted light to be emitted more uniformly over the Illumination Aperture adjacent the front face 106. These extractors are similar to those on the back surface 54 LGP 52 of FIG. 2A. In FIG. 5A, the extractors 104 serve mainly to control the distribution of the extracted radiance (which is extracted primarily due to the inclination of the face). However, by carefully selecting a nonlinear shape of the face, a need for such extractors can be alleviated resulting in less costly and thinner device with acceptable uniformity and improved output efficiency.

The extractors 104 can be produced by high resolution screen printing of diffuse high reflectance white paint, high resolution surface treatment by laser radiation (beam), embossing, chemical etching, mechanical surface roughening, or by special holographic techniques. Extractors with constant or controlled CF can also be applied to side edges of the LGP (except input light coupling edges) and/or to the front face of the LGP, for even better brightness uniformity over the aperture; in the case of application to the front face, they must be of a transparent diffusing type. Such multi faced extraction is especially effective for a small aspect ratio, AR (ratio of the face diagonal of the LGP to its maximum thickness)—0.3<AR<3. In addition to the extractors, all surfaces of the LGP, except those facing the aperture area, are covered by a reflector 108 such as a high-reflectance sheet, or a reflective material located inside a housing made of or covered with a highly reflective material, as described above.

Figure 5B:
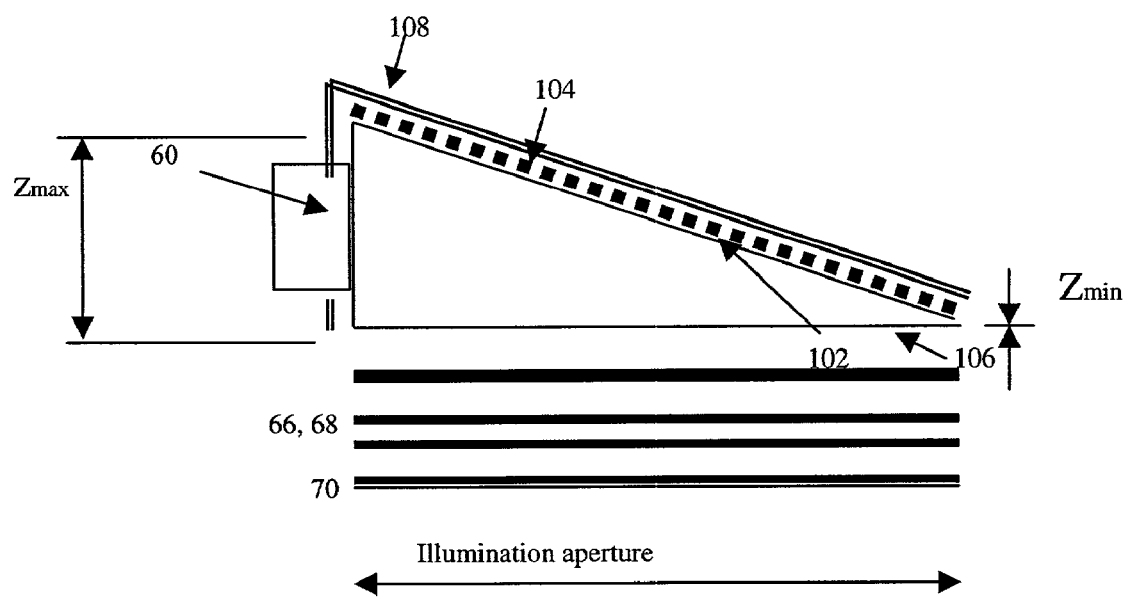
FIG. 5B illustrates an LGP similar to the LGP in FIG. 5A, wherein the flat faces towards the exit aperture, in accordance with an embodiment of the instant invention.

In an alternative embodiment of the invention, a backlight 120 based on a wedge LGP, shown in FIG. 5B, light is emitted into the Illumination Aperture through the inclined front face 122. In this case, the light extractors 124 pattern is applied to the planar back surface 126 (which is now the back face, farthest from the aperture). As with FIG. 5A, a reflector 128 is disposed about the sides of the LGP not adjacent the Illumination Aperture. As used herein, the term wedge or wedge shaped should be understood to include all geometries having converging top and bottom surfaces with wedge shaped cross sectional areas). As has been described above, light extracted from a linear wedge shaped LGP, through the effect of gradual reduction of flux incidence angle and convolution of Fresnel equations, has a non-uniform and generally non-monotonous distribution. For intermediate values of a tilt angle THETA there is a local maximum, while for smaller values of THETA, typical for most FID systems with small aspect ratio X/Z, Y/Z the extracted flux increases with the distance from the coupled lamp. This is contrary to the monotonic flux decrease characteristic for planar LGP with extractor means.

In order to overcome the problems of the prior art—specifically to provide a FID with controlled or uniform luminance, the present invention specifies a LGP with one or two faces being non planar (to be referred to as a nonlinear wedge LGP), as illustrated in the exemplary configuration of FIG. 5A. The tilt of face 102 of LGP 100 at each point is calculated so as to ensure the required flux extraction density over the whole light emitting area of the FID. The calculation is based on known optical principles, such as Fresnel equations, and uses a special iterative approximation procedure, similar to that discussed hereabove for extractor patterns. It also contains a special module for generation of aspheric asymmetric optical surfaces with different curvature along principal planes. It can, again, be aided by software suitable for analyzing nonimaging optics.

The calculation of the curvature of the face can, and preferably should, also maximizes the flux extraction from the LGP during one forward path; as has been shown hereabove, this provides for maximum extraction efficiency. Preferably, the calculation is also aimed at achieving a minimal volume, and hence a minimal weight, of the plate, consistent with a given edge width $Z_{max}$ (which is required to assure a certain coupling efficiency with the adjacent lamp) and $Z_{min}$. Minimal LGP volume and weight, which also minimizes system costs, is of obvious practical importance—especially for larger illumination systems. Indeed, it can be seen from FIG. 5A that the LGP thickness Z drops with a diminishing gradient over its length X (i.e., a drop is more steep near the coupling edge, meaning a monotonically diminishing second derivative-curvature) that a width of a linear wedge. Typically Z reaches a value of $(Z_{min}+Z_{max})/2$ at $X=0.15-0.30\ X_{max}$ while a linear wedge has this average width at $X=0.5\ X_{max}$. It can be inferred that the relative volume and weight savings offered by a non-linear wedge grow with a diminishing $Z_{min}/Z_{max}$ ratio. This "volume conservation" is a fundamental property of non-linear wedges, which is explained by a residual "delayed" extraction of the forward propagating flux.

For most systems with uniform flux extraction the wedge forms a smooth concave surface, i.e., curvature is a monotonic constant sign function. However, with some boundary conditions and non-uniform flux extraction functions, the curvature can be made to change sign at localized sections of the wedge resulting in a locally oscillating (wavy) surface profile (not shown). These local irregularities are introduced to prevent an appearance of "hot" spots with excessive flux extraction caused by a residual flux from the adjacent wedge sections.

It is noted that the configuration of FIG. 5A is asymmetrical (having a single LED lamp at one edge and therefore the plate profile is asymmetrical. In a symmetrical configuration such as, e.g., FIG. 6I (having two identical and opposing multiple LED lamps), the profile would also be symmetrical with the thinnest point lying in the center of the LGP. Similarly, FIG. 6J depicts yet another variant of the present embodiment with two linear CCFLs (Cold Cathode Fluorescent Lamp). Linear and variously shaped ("L", "U" and rectangular shaped) CCFLs can also be used in other embodiments hereinbelow.

Figure 4A:
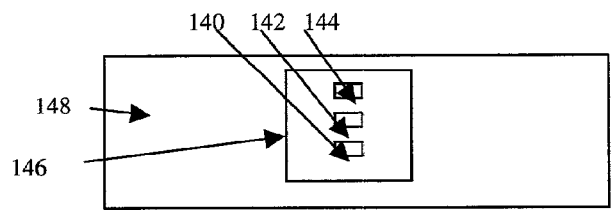
FIG. 4A illustrates the position of the individual red, green and blue dies inside the RGB LED relative to the side face of the LGP, in accordance with an embodiment of the instant invention.
Figure 4B:
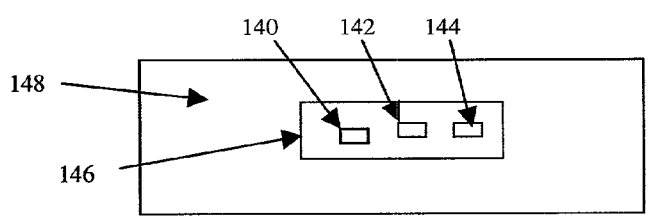
FIG. 4B illustrates a horizontal position of the RGB dies, in accordance with an embodiment of the instant invention.

In the case of a wedge-shaped LGP with closely adhering enclosure, the Aspect Ratio(AR) of the backlight can be defined as: $AR=DS/Z_{max}$, where DS is the diagonal size of the illumination aperture. For monochromatic microdisplays according to the invention, with DS between 0.25 and 2 inches, the achievable aspect ratio is in the range 10<AR<100. For sequential color microdisplays of the same size, the achievable aspect ratio is preferably in the range 3.33<AR<33, assuming that three RGB LEDs are stacked across the edge of the LGP (as shown in FIG. 4A). If, however, they are mounted along an edge of the LGP (as shown in FIG. 4B), the aspect ratio may be greater, namely 10<AR<100. For larger LCD displays, 2"–20" with DS between 2 and 20 inches and multiple LEDs coupled to an edge, the achievable aspect ratio is still greater, namely 80<AR<800.

Figure 4C:
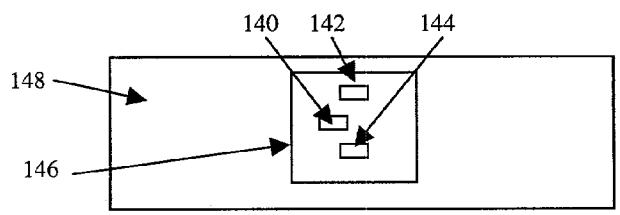
FIG. 4C illustrates yet another position of the RGB dies in accordance with an embodiment of the instant invention.

More particularly, FIGS. 4A to 4C illustrate various arrangements of the three dies 140, 142, and 144 emitting red, green and blue light, respectively, in an LED device 146, in relation to the edge of the LGP 148 into which their emitted light is coupled. Preferably the three dies are arranged along a straight line across the edge, which is normal to the aperture plane, as shown in FIG. 4A. This arrangement is suitable for AR of up to 33 (as discussed above) and has the advantage of best color uniformity. For greater values of AR, i.e., thinner LGPs, an arrangement along a line parallel to the aperture plane, as in FIG. 4B, is preferable. Yet another possible arrangement of the three dies is shown in FIG. 4C.

Figure 6A:
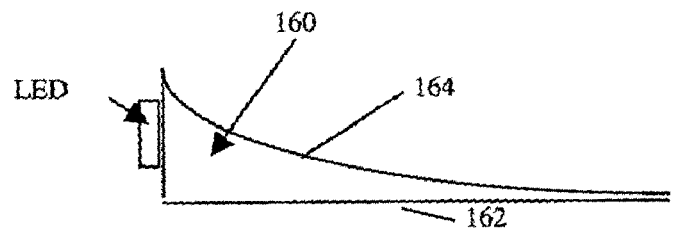
FIG. 6A illustrates schematically an LGP having a non-linear wedge shape, in accordance with the instant invention.
Figure 6B:
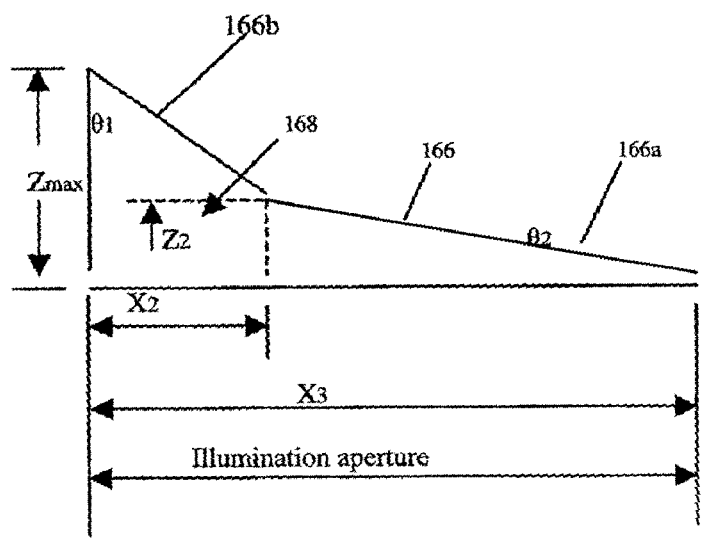
FIG. 6B shows a wedge shaped LGP having two linear sections with different tilt, in accordance with the instant invention.
Figure 6C:
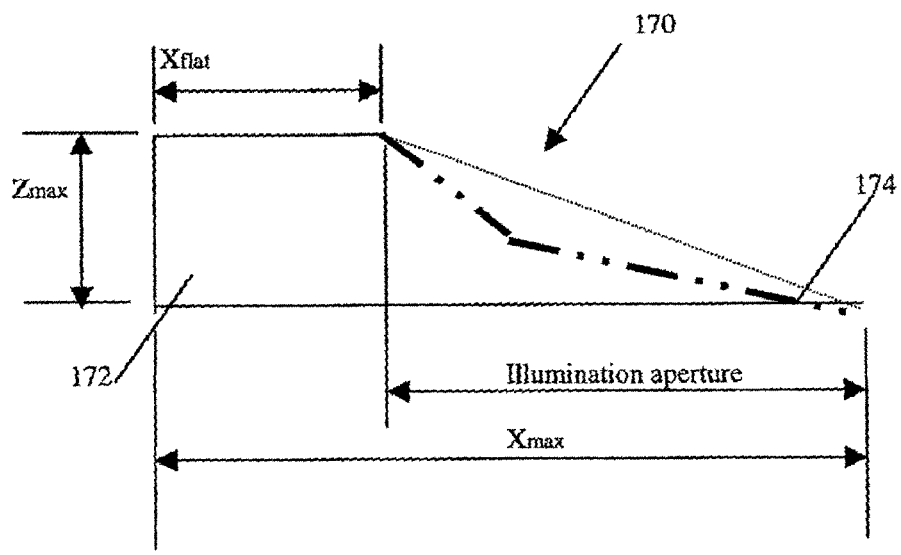
FIG. 6C illustrates a wedge shaped LGP having a planar section proximate to the light source, in accordance with the instant invention.

An alternative way to the use of flux extractors, to achieve the desired flux emission uniformity over the aperture area is to make its inclined face, whether front or back, generally non-planar. Preferably, the face has a concave shape, shown schematically in FIG. 6A. Specifically, FIG. 6A is an LGP 160 having a first planar surface 162 and a second non-planar surface 164. The optimal shape of this non-planar surface 164 is computable, using iterative calculation methods and may, in general, have double curvature (not shown). One variant of a concave wedge is shown in FIG. 6B, wherein the inclined face is composed of at least two planar surfaces 166a and 166b. For the case of two planar surfaces, preferably the ratio of the length, X2, of the second surface to the overall length, X3, of the LGP is less than 0.3, and the ratio of the depth, Z2, of the LGP at the joint of the two surfaces to the its maximum depth (at the thick edge), $Z_{max}$, is in the range $0.05 < Z_2/Z_{max} < 0.3$. Each additional surface has a smaller inclination angle, i.e., $T_2 < T_1$.

In the configuration of FIGS. 6A–6D, the curvature is a one-dimensional function and therefore the LGP is suitable mainly for a FID with lamps at only one edge or two opposing edges of the LGP (which must then be rectangular). A more general configuration of the present invention, illustrated in FIGS. 6I through 6J, which allow extracting light that is coupled from lamps coupled to any or all edges of the LGP. Here, LGP has a curved face whose slope varies from point to point according to a two-dimensional function. As in the one-dimensional case, the function is calculated, in the manner described hereabove, to accomplish a desired (e.g. uniform) distribution of flux extraction over the whole surface of the LGP; the calculation also preferably maximizes the flux extracted in a single path.

It is noted that the two-dimensionally non-linear wedge LGP has a generally smooth concave shape and is thinnest at one point (resembling an aspherical concave or plano-concave lens). Since generally X and Y dimensions are not equal and lamps generally are coupled only to some of the edges the wedge has no axial symmetry. It represents a special and unique optical element (system) which can be termed Aspherical Asymmetrical Edge Lens (AAEL). If the lamps are disposed symmetrically about the edges of the polygonal plate, the thinnest point will be at the center, as depicted in FIG. 6J; most of the forward propagating flux from each individual lamp toward the center is then incident on a concave surface with negative slope and is gradually extracted out. It is further noted that a concave shape minimizes the volume and thus the weight, of the plate (consistent with the edge width necessary to efficiently couple light from adjacent lamps). With some LGP geometries this weight and volume reduction is more pronounced compared to a one dimensional wedge an offers important practical benefits.

Another modification to the shape of the wedge-like LGP, of any of the variants discussed above, is shown in FIG. 6C, wherein the LGP 170 comprises a thick part of the wedge 172 that is extended as a flat portion, of length $X_{flat}$. This flat portion 172, without any extractors on its faces, serves to improve luminance and color uniformity in the light-emitting wedge portion. Preferably the ratio of $X_{flat}$ to $Z_{max}$ (which is the maximum depth of the wedge) is in the range $0.5 < X_{flat}/Z_{max} < 5$. FIG. 6B further illustrates an inclined portion 174 that may either be single inclined as shown in FIG. 5A or double inclined as shown in FIG. 6B.

Figure 6D:
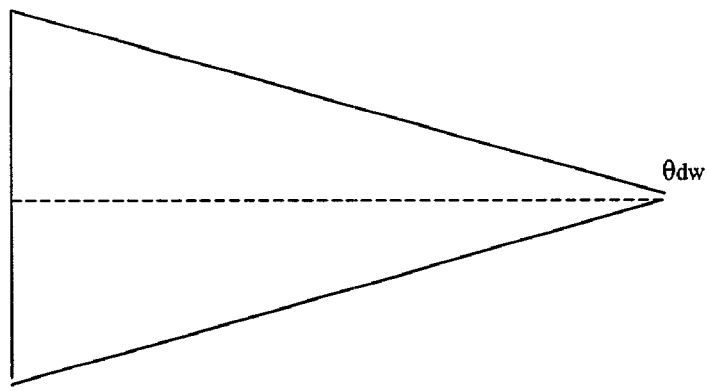
FIG. 6D illustrates a bi-faced wedge, in accordance with an embodiment of the instant invention.

According to yet another modification, illustrated in FIG. 6D and termed double wedge LGP, both front- and back faces of the LGP are inclined with respect to the plane parallel to the aperture plane. In order to attain an optical equivalence (similar flux transfer characteristics) of LGP the inclination angle THETA of each face is one half of the single face inclination angle THETA of the simple wedge LGP (FIG. 3A).

Figure 6E:
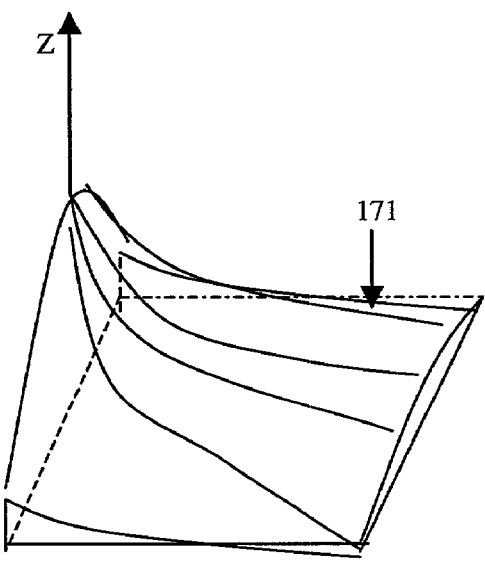
FIG. 6E illustrates an LGP with a non linear rotational face, in accordance with an embodiment of the instant invention.
Figure 6F:
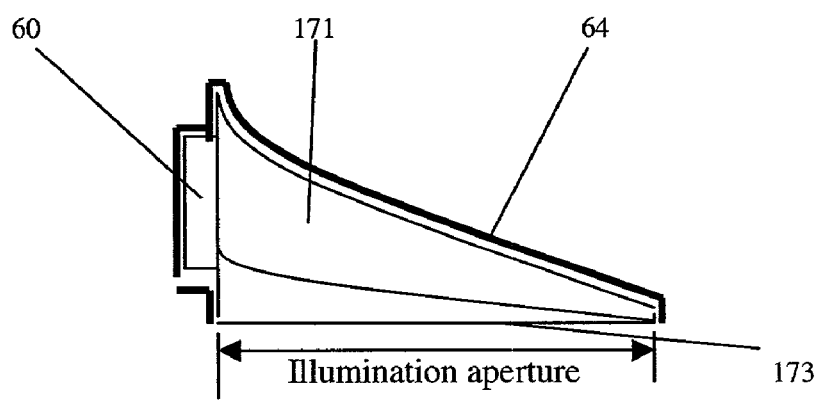
FIG. 6F illustrates the LGP of FIG. 6E with a LED and a reflector, in accordance with an embodiment of the instant invention.

FIGS. 6E to 6H show yet another embodiment of a backlight with a doubly curved wedge LGP, wherein the inclined surface is generated by a 180 degrees rotation of a preferably concave profile curve about an axis that is normal to the aperture plane. FIG. 6E depicts the shape of the LGP 171 itself, with the inclined face marked by a few profile lines. The LGP is here seen to have a planar entrance edge, which includes the axis of rotation Z, and three planar side edges, conforming to the boundaries of the illumination aperture. Compared to a one dimensional wedge-like LGP such two-dimensional wedge shaped LGP effects more efficient and uniform flux extraction along all directions of the flux emanating from the source. As a result this may ease a requirement for a closely controlled extraction distribution, or abolish a need for depositing an additional extraction pattern on the face(s) of LGP altogether. An important characteristic of the shape is that an inclination angle (first derivative) gradually diminishes farther away from the source for all cross-sections. FIGS. 6F–6H depict various exemplary configurations of a backlight with a rotational face LGP. In those of FIGS. 6F and 6G the aperture is close to its planar face 173, while in FIG. 6H the illumination aperture is close to the curved face 175. FIG. 6G depicts the use of a coupling section between the LED and the LGP (instead of direct contact between the LED and the entrance edge of the LGP, as in FIGS. 6F and 6H), to be described further below.

Figure 7A:
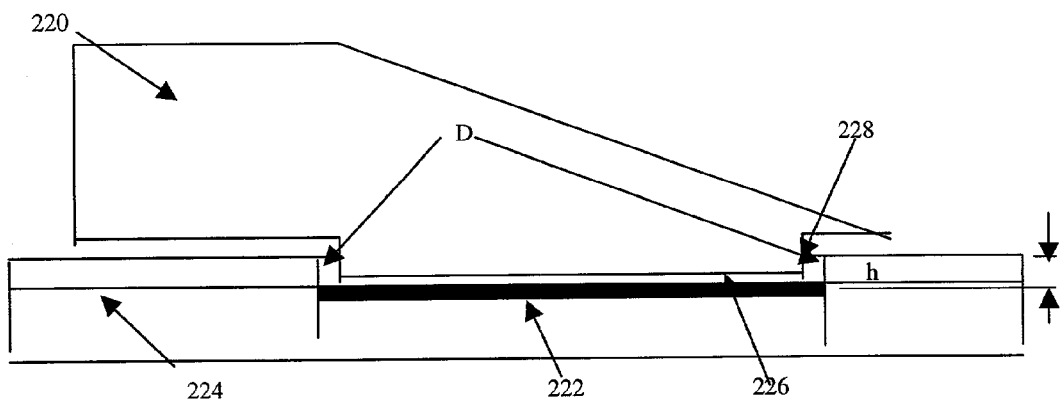
FIG. 7A illustrates a wedge-type LGP including an LGP-LCD coupling section, in accordance with an embodiment of the instant invention.

Referring now to FIGS. 7A–7D, there is illustrated therein a wedge-shaped LGP including an LGP-LED coupling section. This configuration is aimed at improving the coupling of light emanating from the LGP 220 into the LCD device 222. The LCD glass is typically assembled inside a supporting, usually black, frame with some distance, h, between the glass and the external face of the frame. It has been found, in particular, for small 0.25"–0.5" displays that, if the emitting face of the LGP were placed against the outer surface of this frame, a large portion of the emitted flux would be absorbed by the inside edges, D, of the frame, thus causing loss of light (and therefore—of efficiency); even if the LCD frame depth, h, is less than one millimeter, this lossy absorbtion can be considerable. In the configuration of FIG. 7A, the light emitting face 226 of the LGP 220 is on a rectangular protrusion 228 thereof, which fits inside the LCD's supporting frame 224. The edges of this protrusion 228 are preferably painted with a white diffusely reflective paint, or have reflectors attached to them, so as to keep all exiting light within the aperture at the plane of the LCD. An alternative to this configuration with similar effects is to paint the inside edges, D, of the supporting frame itself with a reflective paint or to use highly reflective plastic material for the frame.

Figure 7B:
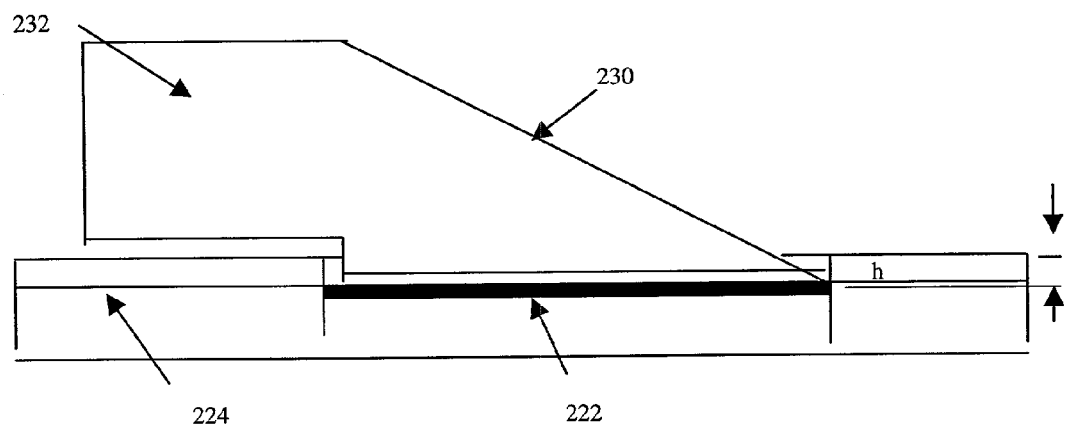
FIGS. 7B and 7C illustrate slight modifications to the LGP-LCD configuration of FIG. 7A, in accordance with an embodiment of the instant invention.

In an alternate embodiment of this configuration, shown in FIG. 7B, the inclined face 230 of the LGP 232 begins immediately at the edge of the aperture area inside the frame 224 of the LCD 222, resulting in a better backlight-LCD coupling efficiency and reduced size of the LGP. Expressed differently, the embodiment of FIG. 7B lacks the rectangular protrusion of FIG. 7A.

Figure 7C:
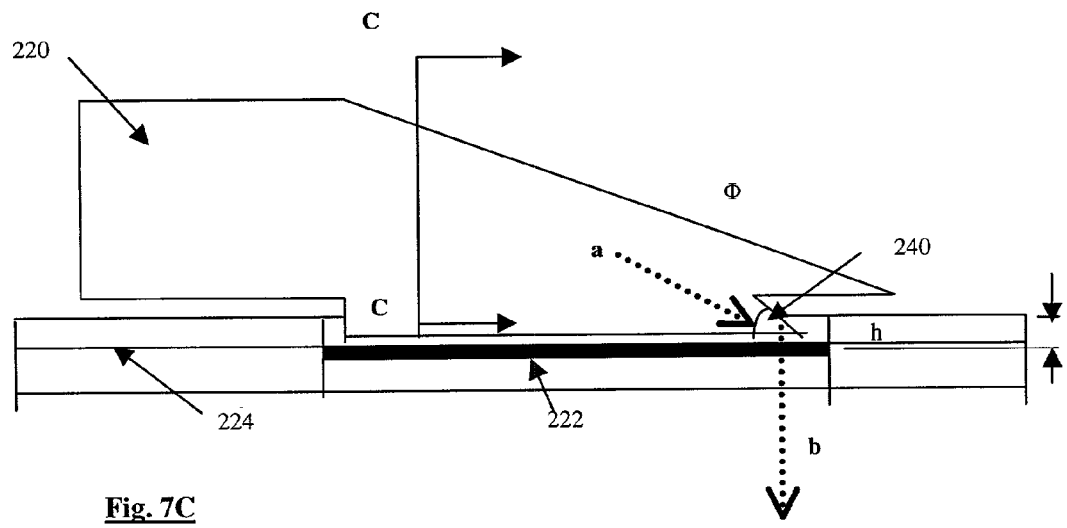
Figure 7D:
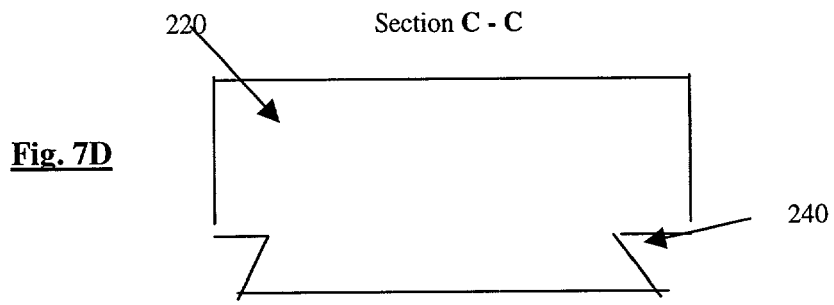
FIG. 7D illustrates a Y-Z cross section of the LGP of FIG. 7C.

In yet another embodiment of this configuration, depicted in FIGS. 7C and 7D (the latter showing a cross section of the LGP of FIG. 7C), edge surfaces of the protrusion 240 are inclined by an angle Φ from the normal, so that exiting light rays—for example light ray "a"—hit this surface with an angle THETA that is smaller than the critical angle for the light guide material and are totally reflected towards the aperture area, for example light ray "b". Thus no reflective material or paint is required for these edge surfaces.

Figure 8:
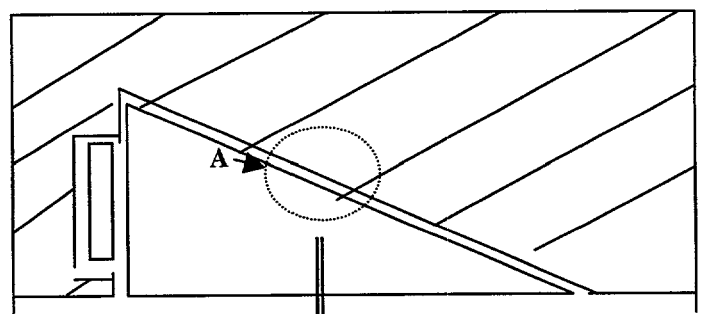
FIG. 8 illustrates a housing with a specially profiled surface optically laminated by a thin adhesive layer to at least one surfaces of the LGP, in accordance with an embodiment of the instant invention.

In another embodiment illustrated by FIG. 8, the pattern of light extractors 250, rather than etched or printed on the face of the LGP 252, is etched, engraved or embossed onto the surface of a reflective material that lines the inside of the LGP housing 254. In this embodiment, the pattern may be the complement (i.e., "negative") of the one designed for the LGP's back face. An optically transparent adhesive layer 256, preferably with a refractive index equal or near the refractive index of the LGP material, is attached to the engraved lining of the housing. The adhesive layer 256 does not penetrate into the grooves of the pattern but sticks only to the flat original surface level. The LGP is then bonded to this adhesive, producing optical contact only at flat portions, not at the grooves. The effect is then total internal reflection (TIR) at grooved portions, and diffuse light-extracting reflection at the flat portions of the lining surface, which is equivalent to applying a complementary screen printed extractor pattern directly to the face of the LGP.

Similar embossing can also be applied to other reflective surfaces of the housing, enclosing the LGP. This technique saves the operation of applying extractor patterns to the LGP directly and ensures better repeatability and eventual reduction of production costs. High resolution embossed patterns with 600 dpi and more can be incorporated into the housing mold and mass-produced without any added costs. According to a modification of this embodiment, rather than bonding with an adhesive, direct optical contact can be effected by tight sealing of the LGP inside the housing or some mechanical pressure from the front cover of the block. The latter can also prevent penetration of harmful humidity and dust. While this embodiment is illustrated in FIG. 8 with respect to a wedge-based configuration, it is applicable to other shapes of LGP, such as the flat LGP of FIG. 2A.

Figure 9A:
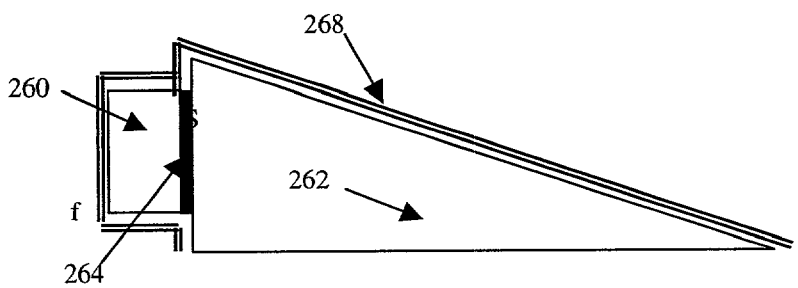
FIG. 9A shows an illumination device with a light source optically bonded to the LGP, in accordance with an embodiment of the instant invention.
Figure 9B:
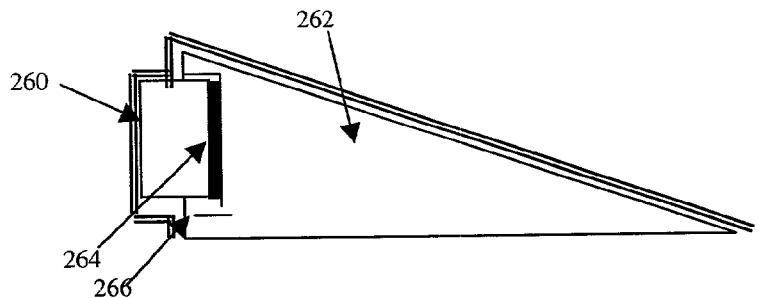
FIG. 9B shows an illumination device in which a light source is positioned inside a recess in the face of the LGP, in accordance with an embodiment of the instant invention.

According to an embodiment exemplified by FIGS. 9A and 9B, the light source 260, preferably a LED, is bonded to the LGP 262 with an adhesive 264 (preferably optical adhesive with a refractive index equal to that of the LGP plate). An optional recess 266 in the LGP, depicted in FIG. 9B, may facilitate the bonding. Such bonding greatly enhances the coupling efficiency of flux emitted from the LED into the LGP, by eliminating the Fresnel retroreflection from the LED capsule's air interface back onto the LED or onto the reflector cup surrounding it. Disposed around the LGP and the light source is a reflector 268 as described above.

Figure 9C:
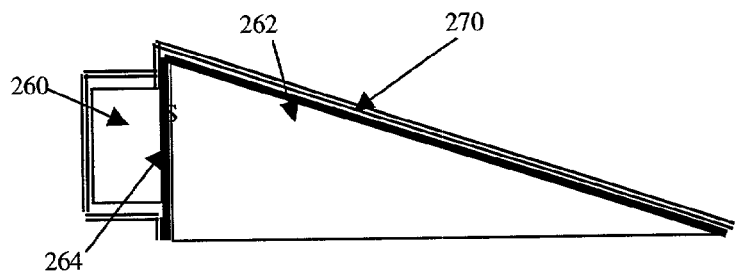
FIG. 9C shows an illumination device in which the reflector is optically bonded to the LGP, in accordance with an embodiment of the instant invention.
Figure 9D:
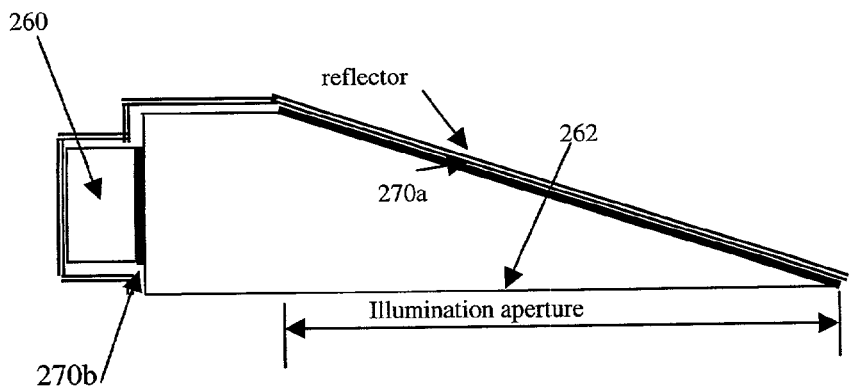
FIG. 9D shows an illumination device with a LGP such as that depicted in FIG. 6C, and a reflector bonded to the LGP on the inclined face, in accordance with an embodiment of the instant invention.

In the embodiments of FIGS. 9C and 9D, the reflector 268 is a reflective sheet 270 that is optically bonded over the whole (FIG. 9C) or parts of the face opposite to the aperture area (FIG. 9D) and serves to extract the light into the aperture area. The LED is optionally optically bonded to the LGP to improve the coupling of the LED to the LGP, as explained above. In this case when light is extracted through the inclined face (as in FIG. 5A), the reflective layer is bonded to the flat face (now opposite to the aperture area). The LGP depicted in FIG. 9D has the shape shown in FIG. 6C, but it can have any of the shapes described above. Reflecting layers can also be bonded to the side faces of the LGP. Reflectors thus bonded act as continuous diffuse extractors (CF=1), similar to a diffusing printed paint. If applied to parallel-faced LGPs, such bonding will, in general, result in a significant luminance non-uniformity, with higher luminance near the light source and lower luminance at the other end of the LGP. However, in the case of a wedge-type LGP (as in the preferred embodiment), where the inherent distribution of extracted luminance is greater towards the far end, the two distribution effects tend to cancel each other, resulting in a fairly uniform luminance.

Figure 9E:
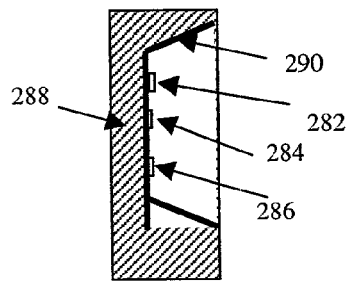
FIG. 9E shows a cross section of an RGB LED.

The light source 260 in any of the above FIG. 9 configurations is preferably embodied as depicted in FIG. 9E, as a three-color LED 280, containing R, G and B dies 282,284 and 286 respectively, in a single housing. Preferably the LED housing is made of or coated with a reflective material, in order to minimize the absorption losses. Such materials are known in the art and used for similar applications. Also preferably, the surface inside the LED housing on which the R, G and B dies are located, is shaped as a cup and coated with, a highly reflective material (such as Spectralon or titanium-oxide pigmented Lexan).

Figure 9F:
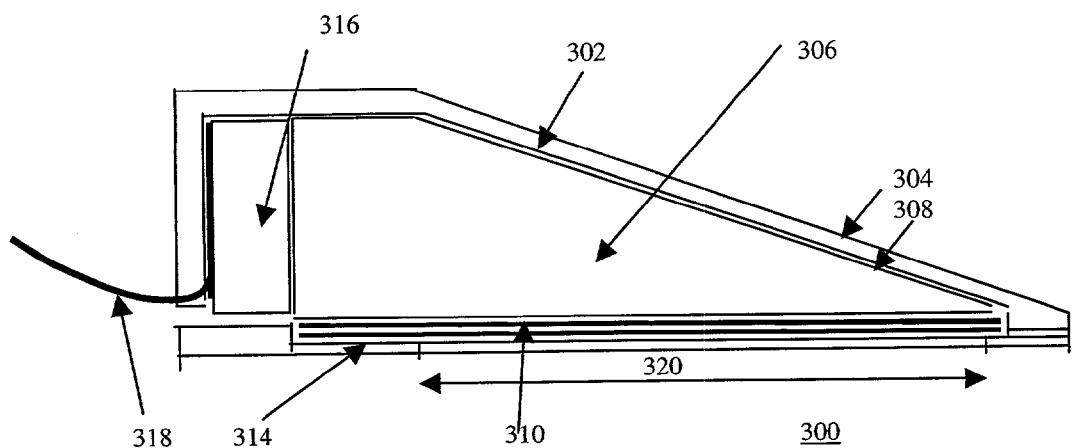
FIG. 9F shows an LGP, a light source and optical films enclosed in a housing made of a light reflective material, in accordance with an embodiment of the instant invention.
Figure 10A:
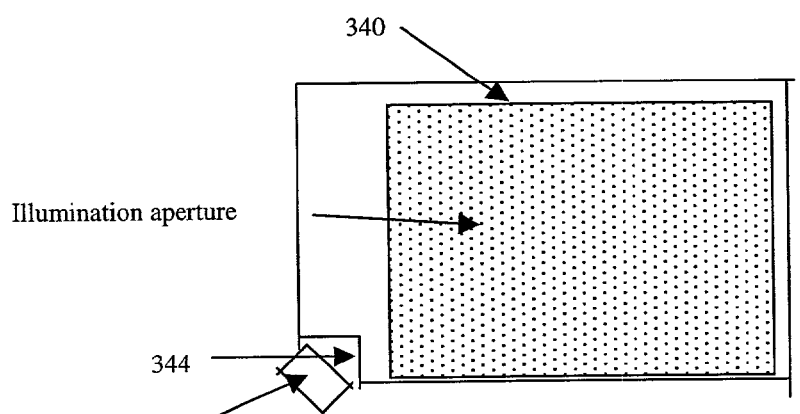
FIGS. 10A–10F illustrate a series of LGPs with a Source-LGP coupling section representing corner cut-outs of different shapes, all in accordance with the instant invention.
Figure 10B:
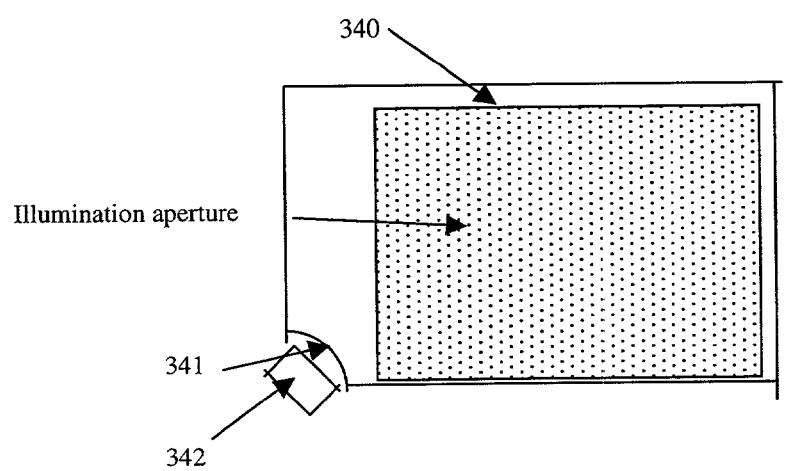
Figure 10C:
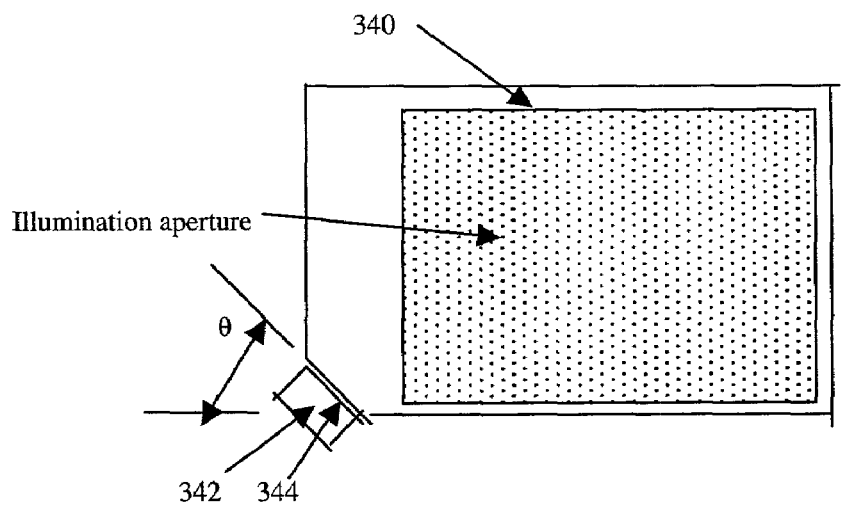
Figure 10D:
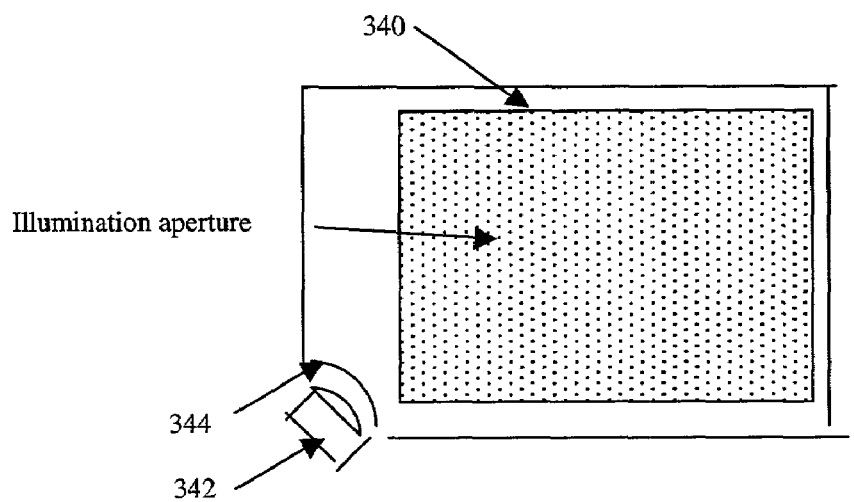
Figure 10E:
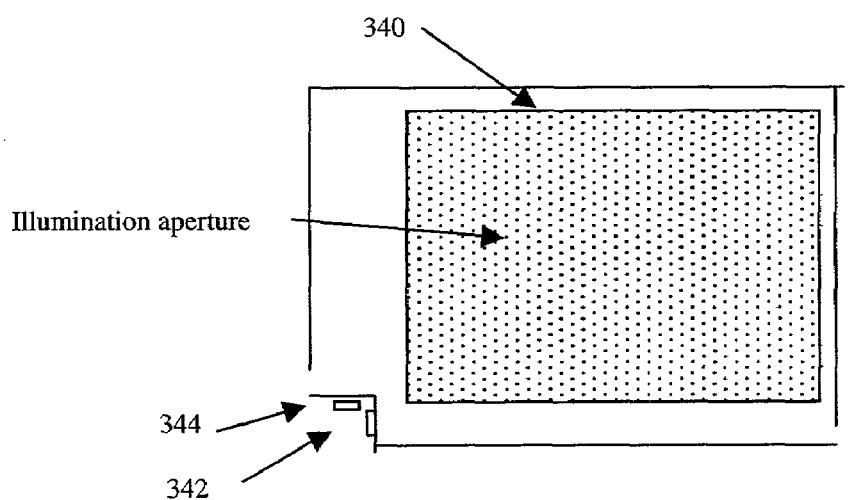
Figure 10F:
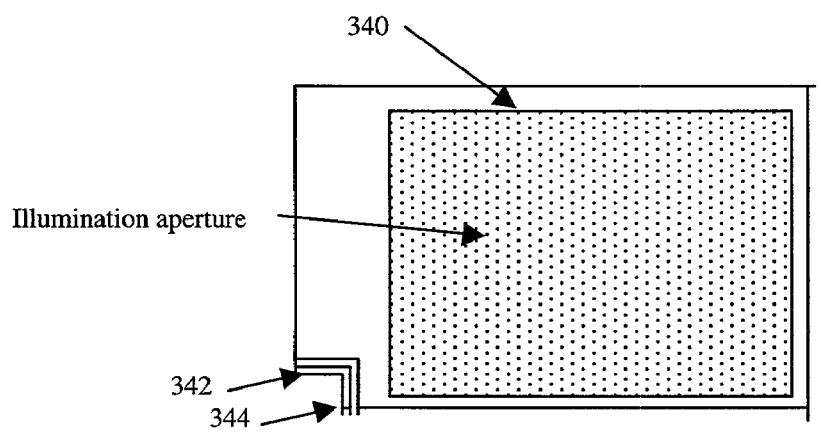
Figure 10G:
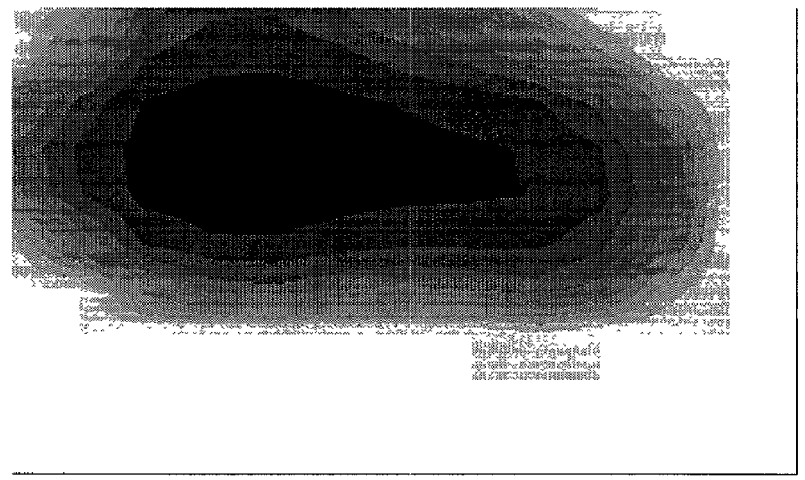
FIG. 10G show the 2D pattern of the light extractors on the LGP of FIG. 10C.

A complete assembly of a backlight according to a preferred embodiment is depicted, in cross section, in FIG. 9F. It features a watertight backlight housing and extremely compact design, with minimal dimensions. More specifically, FIG. 9F illustrates a display assembly 300 in which all of the components are enclosed within a housing 302. The housing 302 is lined with a reflective material 304 as described above. Also enclosed within housing 302 is the LGP 306 shaped in the embodiment described with respect to FIG. 6C. The LGP 306 has a back face 308 which may include light extractors as described above, and a front face 310 proximate to the Illumination Aperture. The housing likewise has an opening 312 formed therein which accommodates the Illumination Aperture. Disposed adjacent the front face 310 is a plurality of light influencing films 314 all as described above. A light source 316, with related drive circuitry 318, is coupled to an edge of the LGP. Finally, a display device such as an LCD 320 is disposed in front of the films 314.

Referring now to the configurations illustrated by FIGS. 10(A–F) and 11(A–C), all are front views and all based on flat and wedge like LGPs, at least one light source is located in proximity to an edge formed by truncation of a corner of the LGP 340 or by a cut into its outline edges. The purpose of this feature is to launch the flux from the LED 342 into the LGP so as to more fully spread within it during a first pass, thus increasing efficiency and uniformity. In the configurations of FIGS. 10A–10F the truncation 342 is at a corner of the LGP, with each different shape truncation imparting different characteristics. In FIG. 10A the cutout is rectangular and in FIG. 10B it is elliptical; in both these cases the optimal angle formed by the diagonal of the cutout is related to the two dimensions of the LGP similarly to the triangular cut. In FIG. 10C the cutout has a triangular shape. The optimal angle of this cut edge depends on the ratio between the two dimensions of the rectangular LGP; it is 45 degrees for a square LGP, 50–60 degrees for a ratio of 4:3. In FIG. 10D the cutout is elliptical congruent with a standard LED with "Dome" or elliptical cup lens in order to effect most effective flux coupling. In FIG. 10E the cutout is of rectangular shape to accommodate two light sources, each launching the flux to a different domain of the active display area. Such coupling architecture facilitates more uniform flux distribution over the display. In FIG. 10F two sources (SMT type LEDs) are mounted within a single housing. An example of a CF distribution for a triangular cutout coupling section at an upper left corner is shown in FIG. 10G. It is noted that this distribution differs significantly from the ones shown in FIG. 2B.

Figure 11A:
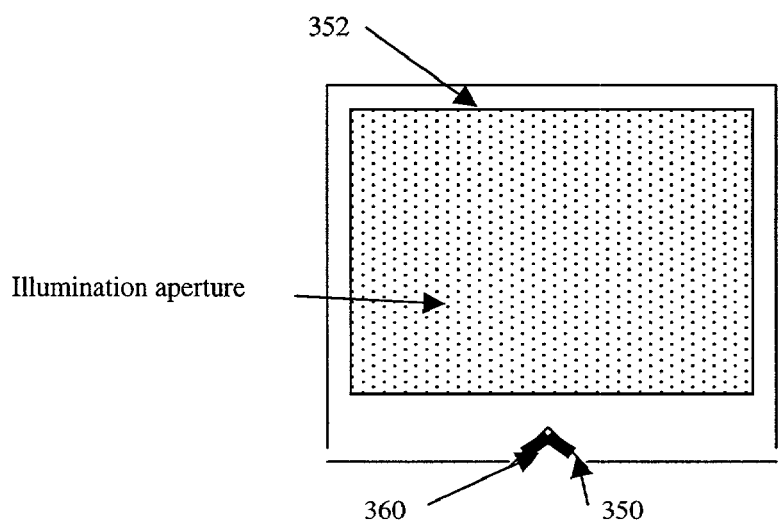
FIGS. 11A–11C illustrate a series of LGPs with a single and/or multiple cutout coupling sections of different shapes located at corner(s) and other points along any of the LGP edges, all in accordance with the instant invention.
Figure 11B:
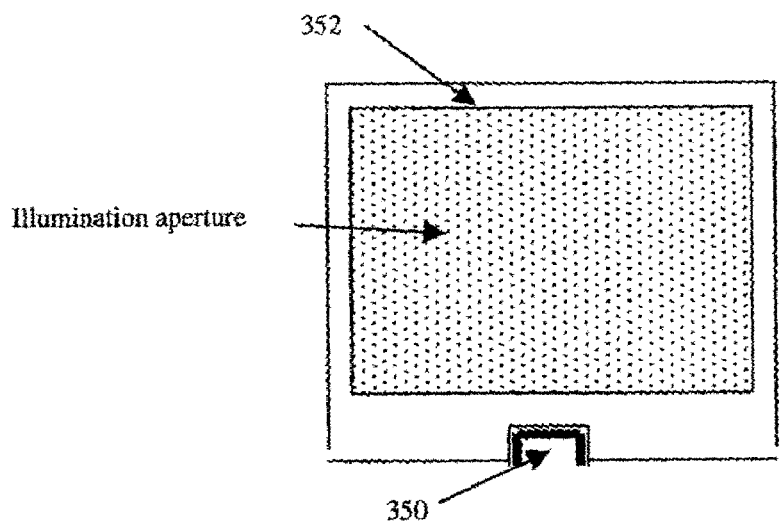
Figure 11C:
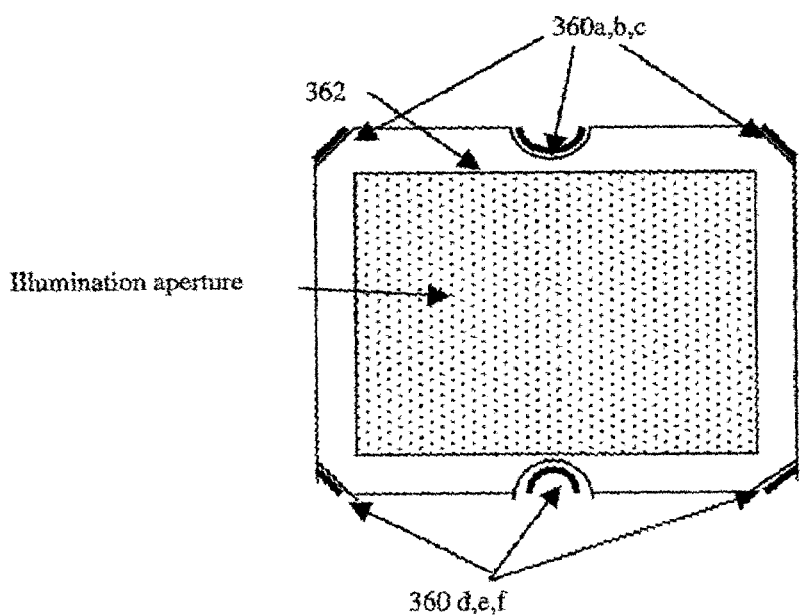

In FIGS. 11A and 11B the truncation 350 is in the middle of an edge of the LGP 352, the cutouts being triangular and rectangular, respectively at the four corners and in the middle of two edges of the LGP. More generally, truncations 360a through 360f can be at any or all corners, as well as anywhere along any edges of the LGP, possibly with differing cutout shapes, as depicted for example in FIG. 11C. This allows deployment of multiple light sources 364a–364f, so as to produce higher luminance or to attain better uniformity with very thin LGPs.

Figure 12A:
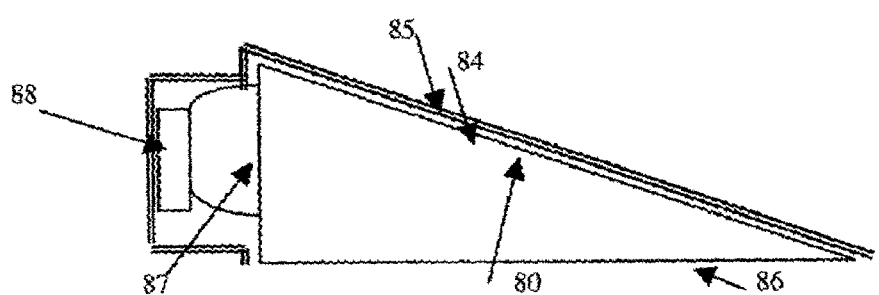
FIGS. 12A and 12B illustrate illumination devices with specially shaped LED-LGP coupling sections, all in accordance with the instant invention.
Figure 12B:
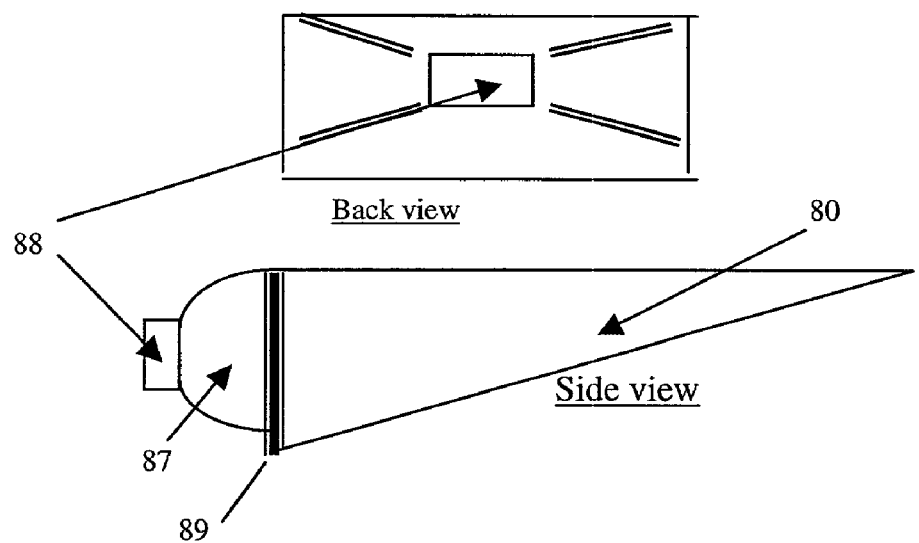
Figure 12C:
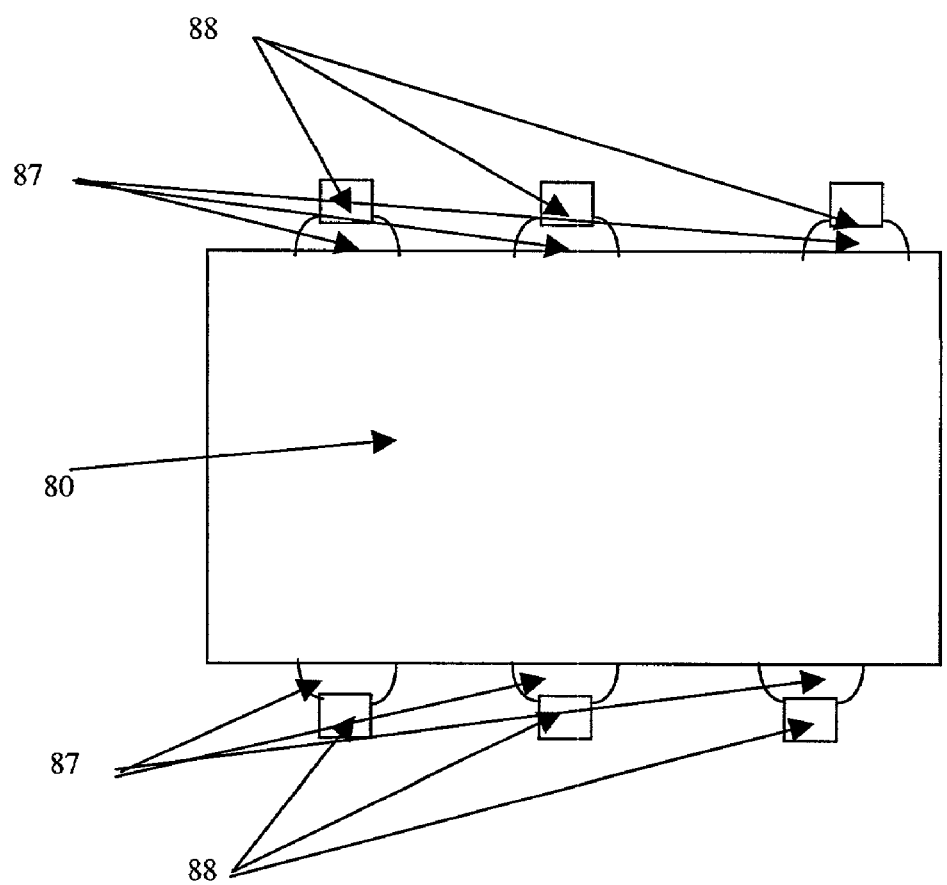
FIG. 12C illustrates a device similar to that of FIG. 12B, but with a plurality of LEDs around the LGP, in accordance with the instant invention.

FIGS. 12A–12C illustrate another feature in the preferred embodiments of the invention, namely a focusing conic energy conserving coupling section (also referred to as a focon), placed between the light source, e.g., an LED and the LGP. The basic arrangement, in conjunction with the description and reference numerals of FIG. 3B, is depicted in FIG. 12A, with the addition of a focon 87. The focon is made of transparent material with a possibly higher refractive index (about 1.5–1.75 for plastics, such as acrylic, 1.8–2.2 for special glasses) and its outer surface has a rotationally symmetric or elliptic expanding convex shape designed to reflect all the flux rays emanating from the LED by total internal reflection (TIR) and couple them into the LGP 80. Its shape should be carefully designed in order minimize its dimensions while eliminating backscatter (retroreflections) onto the LED and preventing light rays entering the LGP from falling short of the critical angle and thus causing undesired light leakage from the LGP. Prior art coupling one dimensional sections (U.S. Pat. Nos. 5,618,096 and 5,921,652) describe "planar" coupling sections having a quasi-circular shape and flat surface in X-Y plane. This and similar configurations suffer from all these shortcomings, namely either light leakage, causing "hot" spots, backscatter and associated flux losses or large size. The curvature of the outer surface of the focon is such that all the flux emitted from the light source 88 within a 90 degrees cone (in a quasi lambertian distribution) will strike the surface at angles greater than the critical angle (e.g., 41.8 degrees for n=1.5) and be reflected by it, through TIR, in directions that form angles greater than critical angles with respect to the faces of the planar LGP. In prior art devices such coupling sections do not fulfill this latter condition. As a result, some light from the source entering the LGP exits immediately at a very small area surrounding the coupling point. This leakage drastically reduces the device efficiency, since the escaping flux is lost and cannot be coupled back into the LGP according to a fundamental "etendue conservation" principle. In addition, the leakage point creates a pronounced luminance non-uniformity, which calls for extending the coupling section beyond the active area, thus causing a larger device footprint.

Furthermore the foconic shape can be calculated to allow for a controlled leakage of light through the active face of the LGP (overtaking light extractor functions) or for additional collimation of the flux injected into the LGP. It is known to those skilled in the art that such additional collimation enables to obtain more concentrated luminance distribution of the extracted flux (LOS—line of sight enhancement) by using microprismatic light extractors. Focons with elliptic shapes add an additional degree of freedom in controlling the backlight luminance along two axis or a degree of luminance amplification along cardinal spatial directions (6 and 3 o'clock)

The focon 87 is calculated according to optics methods specially adopted for immersed source (immersed optics) for a given size of the light emitting chip(s), their spatial configuration and production tolerances and may be bonded to the LGP, as shown schematically in FIG. 12B with an adhesive layer such as one of those described herein above, or preferably is an integral part of the LGP, in any of a number of configurations. Some of the latter are depicted in FIGS. 12A, 12C and 12D, as well as in FIG. 5G,—all showing the LGP and the coupling section as a monolithic piece. In the configuration depicted in FIG. 12C, a multiplicity of LEDs is bonded to respective multiple locations along edges of the LGP, each through a coupling section as described above. In all these embodiments the coupling section preferably turns into a flat or tapered section of the LGP at a point that corresponds to the distance from the LED at which direct rays reach the critical angle. Under this constraint the section can have various shapes, depending on geometrical constraints and the desired angular distribution of the TIR reflected flux inside the LGP. Such optical architecture is especially efficient for surface-mounted LEDs, usually having a lambertian cup reflector surrounding the LED emitter, which causes high additional losses (within the emitter).

Figure 13A:
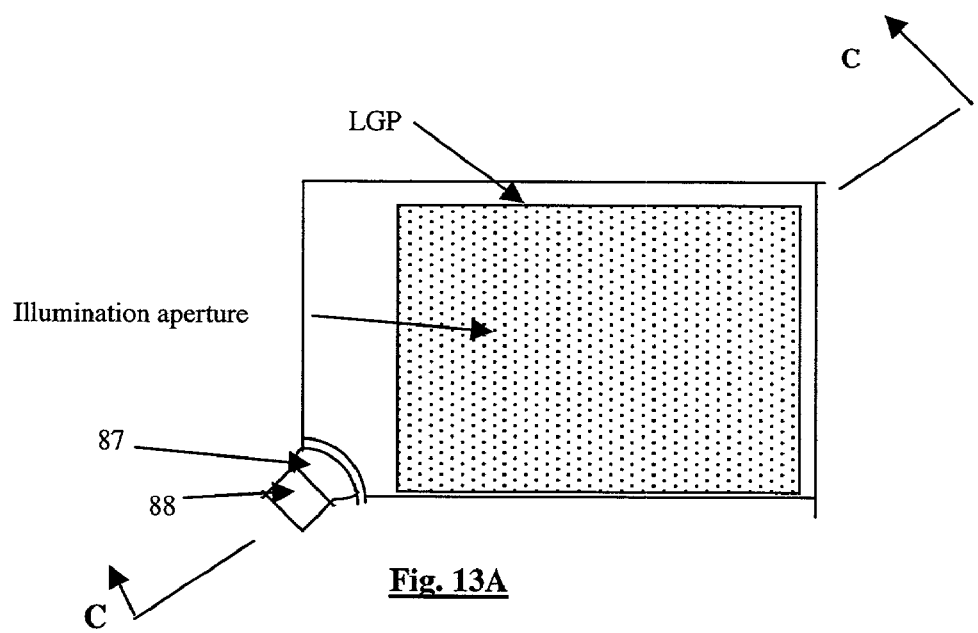
FIG. 13A illustrates a device similar to that illustrated in FIG. 10D, and with an optical coupling section between the LED and the LGP, in accordance with an embodiment of the instant invention.
Figure 13B:
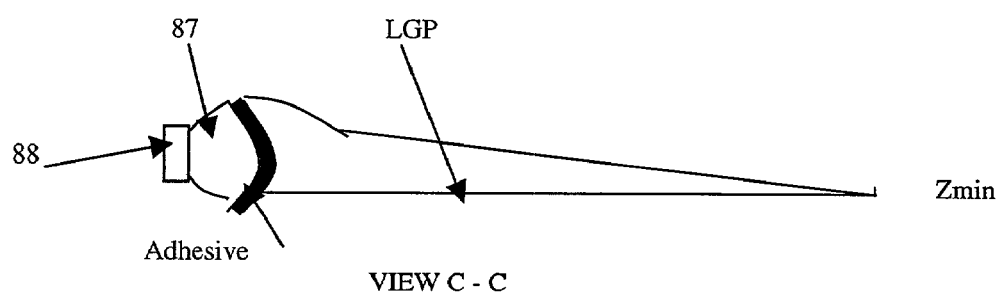
FIG. 13B illustrates a cross section of FIG. 13A, taken along the line C—C.
Figure 14:
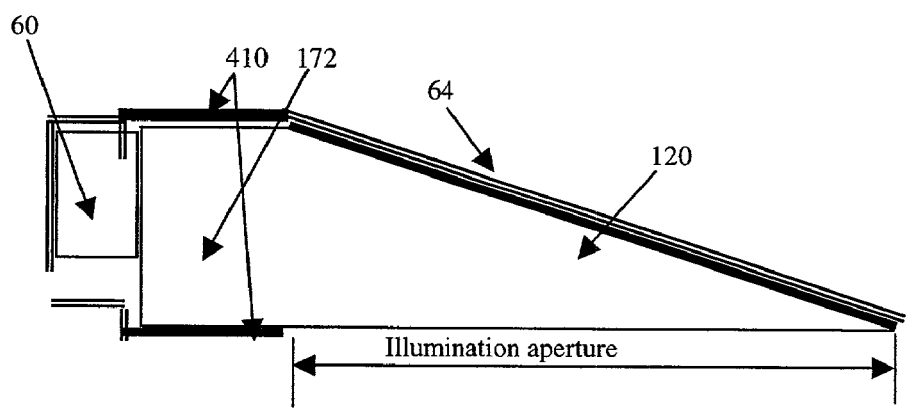
FIG. 14 illustrates an LGP having a metal reflector over a flat portion of the LGP, in accordance with an embodiment of the instant invention.

While in the embodiments of FIGS. 12A, and 12C the focon is produced as one piece with the LGP, in other embodiments and configurations the focon could also be produced as one piece with the LED. FIG. 12A depicts a single LED with foconic coupler coupled to a non-planar LGP. FIG. 12C shows multiple LEDs with foconic couplers coupled to two edges of the LGP, which may be either planar or non-planar along one or two cardinal directions (X,Y). In a further variant, the LED, the focon and the LGP are formed as a one-piece unit. In such an embodiment the single coupled LED, the LGP, in effect, becomes an integral part of the LED device, representing a functionally extended primary optical system. As such it can be applied in two additional functions, namely (i) as primary optics for an LED, enhancing its External Quantum Efficiency; and (ii) as an extended planar radiation source for backlighting and other applications in communication devices employing fiber optics. Apart from having higher output, this optical arrangement has very significant practical benefits: The LGP, formed as the lens of the LED, can be produced, bonded and inspected (measured) directly during LED manufacturing (in place of the conventional encapsulating optics). This alleviates the need for a secondary LED optics, greatly simplifies the backlight assembly equipment and, in particular, eliminates the need for optical quality assurance and reduces the amount of manual labor In the embodiments of FIGS. 13A and 13B, a LED with a foconic section is coupled to a corner of a two dimensional non-planar LGP having a maximal thickness ($Z_{max}$) at the coupling point and a minimal thickness $Z_{min}$=>0 at the (diagonally) opposite corner, as depicted in a cross-section C—C in FIG. 13B. Because of a number of practical limitations, namely size and cost considerations, a number of additional elements can be included in the device, although their use is bound to reduce an output efficiency. A metal reflector sheet 410 placed over the flat portion 172of the LGP 170 (as of FIG. 6A) and as shown in FIG. 14, reflects the light rays in the flat LGP portion towards the illumination area, and increases the brightness in the illumination area.

A diffuser 400 placed between the LED and the entrance face of the LGP as depicted in FIG. 15 improves the brightness and color uniformity over the illumination area. The diffuser can be realized in one or more of the techniques known in the art, for example:

- A diffuser sheet between the LED and the entrance face of the LGP.
- A diffusing layer on the entrance face of the LGP in ways known in the art such as roughening of the surface.
- A diffusing layer on the exit face surface of the LED.
- Adhesive mixed with diffusing particles used to bond the LED to the LGP.

Figure 16B:
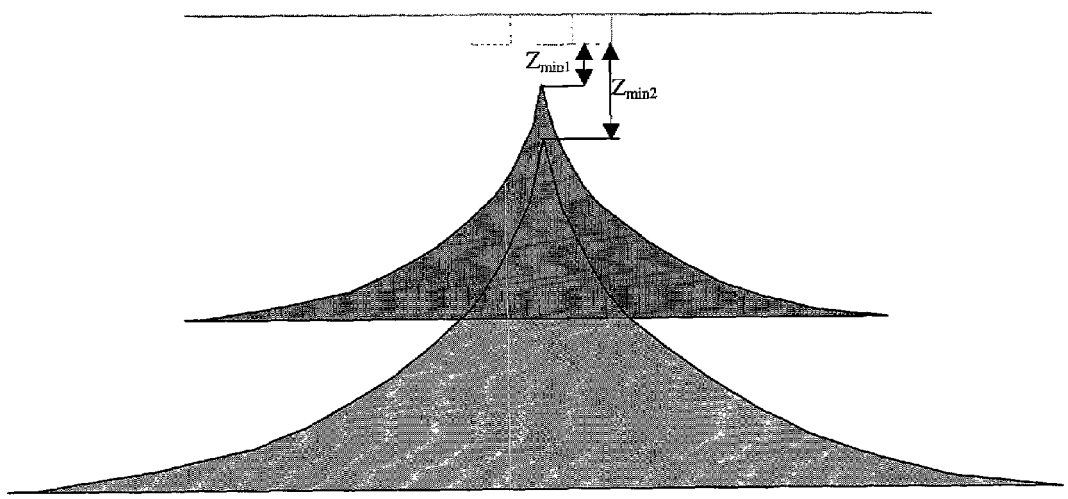
FIG. 16B illustrates two differently scaled vertical foconic "CRATER" coupling section, all in accordance with the instant invention.

A different configuration of a LED-based backlight is shown in FIGS. 16A–16H. Here a small diameter foconic "crater" coupling section 450 is formed at the center of the aperture face of a flat LGP 452 and the LED 454 is positioned a short distance back from the crater, with the light emitting side 456 facing the crater. The LED is embedded (immersed) inside the LGP, as depicted in FIG. 16A, or behind the LGP's back face, possibly optically bonded to it. Since there is no LED encapsulant—air interface such an arrangement maximizes an External Quantum Efficiency of LED by eliminating all the losses due to the retroreflected by TIR flux, which would otherwise be trapped and absorbed in LED. The surface of the crater is so formed that all the light emitted by the LED is reflected back into the LGP by TIR. The reflected light then travels through the LGP by TTR and is extracted towards the illumination aperture by any of the distributed flux extraction means described hereabove. The small central portion of the aperture masked by the crater is illuminated by means of a diffusing film 458 placed over the aperture, as shown for example in FIG. 16A. Alternatively, the crater profile is designed to allow a required flux to be coupled out immediately above it through the exit aperture. Similar to foconic couplers described hereabove, the crater profile can be designed to additionally collimate the intrinsic LED flux distribution, i.e., to reflect it into the LGP at larger angles to its horizontal faces. However, such collimation results in added thickness of the coupler. In a modified embodiment of this configuration, the LGP has a plurality of craters, with corresponding LEDs, in any suitable arrangement, such as shown for example in FIG. 16C. In yet another embodiment—FIG. 16D the LGP 452 has a circular shape with two embedded LEDs. A device with any number of lamps embedded into LGP of any shape can be constructed in a similar manner to fulfill particular requirements to a luminance level and spatial configuration. The device can additionally include any number of BEFs, diffusing and reflecting means similar to those described hereabove.

The "crater" profile can be calculated by methods of non-imaging optics known in the art. The present invention considers two critical aspects of the crater coupling architecture, namely: 1) ins minimal depth dimension; and 2) the unique flux extraction pattern ensuring uniform or desired luminance distribution over the active face of the LGP. Obviously the depth of the crater determines the overall thickness of the LGP. In order to benefit from the crater design the latter one should not considerably exceed the LGP's thickness for a considered above edge-coupling architecture. Secondly in the absence of the specified flux extractor elements over the face(s) of the LGP, the crater solution is of no value for backlighting and most of other practical devices, as the coupled light simply escapes through the edges of the LGP (FIG. 16C)

FIG. 16D illustrates the method to design a crater with the theoretically smallest thickness Z.sub.max for an extended source having finite X,Y dimensions. For given reflection angles (so-called angular reflection function of the coupler) its shape remains invariant with respect to Zmin, the distance of the crater apex from the center of the emitter. Stated differently Z.sub.max is simply scaled by a constant factor Ksc depending on its shape with respect to Zmin:

$$Zmax = Zmin \times Ksc$$

As shown in FIG. 16B.

That is, Zmin should be minimized to obtain the smallest value of Zmax. For a simplified case of a two dimensional emmiter having zero thickness this condition is fulfilled if the Zmin is such that an angle ALPHA(sub) 1 between the normal to the apex point and the direction to the point on the edge of the emitter form an angle equal to a critical TIR angle: ALPHA(SUB)1=ALPHA(SUB)tir. Similarly, for a circumference of the crater at Zmax: ALPHA(SUB)2=ALPHA(SUB)tir. The crater profile represents a single smooth surface with a continuous curvature.

Figure 16E:
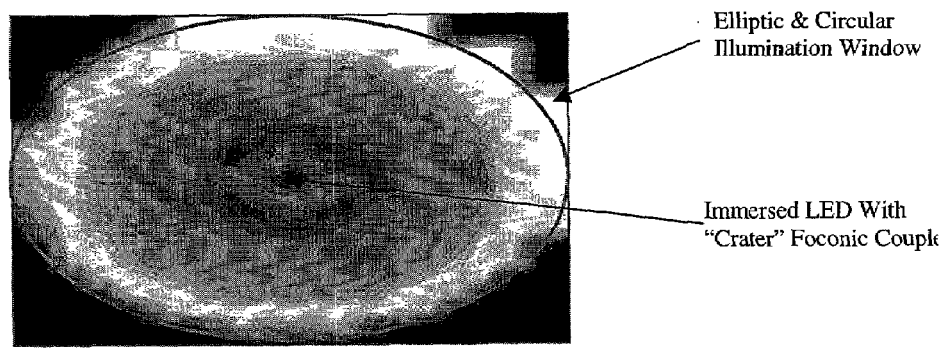
FIG. 16E illustrates CF distribution for a circular & elliptic LGP with a single "crater" coupled LED in its center, in accordance with an embodiment of the instant invention.
Figure 16F:
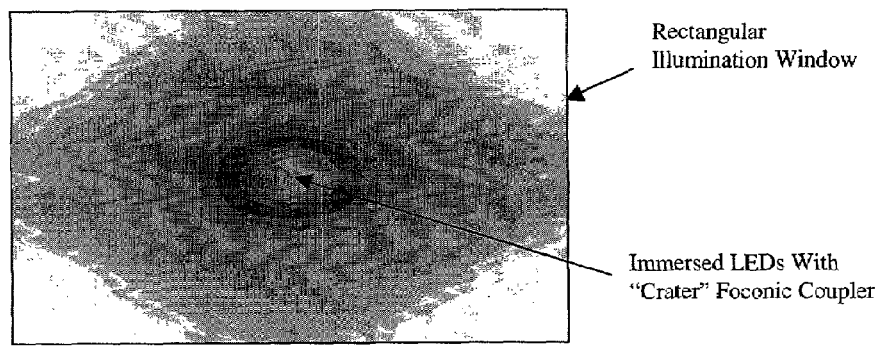
FIG. 16F illustrates CF distribution for a rectangular LGP with a single "crater" coupled LED in its center, in accordance with an embodiment of the instant invention.

FIGS. 16E and 16F show corresponding CF distribution of extractors required to produce a uniform luminance over a rectangular and circular or elliptic LGPs with a single LED coupled in its center. One can observe a very special irregular two-dimensional pattern with larger extraction density in the center (to compensate for the "black hole" effect caused by the crater) and on the periphery of the LGP (to compensate for the reduced density of the internally propagating flux). FIG. 16H illustrates CF distribution for a circular or elliptic LGP with two LEDs shown in FIG. 16G. The distributions have been obtained in an iterative procedure described above and are optimal in terms of ensuring the highest extraction efficiency.

The foregoing describes and discloses merely exemplary embodiments of the invention. One skilled in the art will readily recognize from such discussion and from the accompanying drawings and claims that various changes, modifications and variations can be made without departing from the spirit and scope of the present invention.

I claim:

1. A backlight for a display device comprising:
   - a light guiding plate having at least one edge and a front major surface and a back major surface said front major surface being disposed proximate to said display device, and wherein said back major surface of said light guiding plate forms a doubly curved wedge light guiding plate;
   - at least one light source coupled to said edge of said light guiding plate;
   - a light extraction means disposed along at least one of said front or said back surfaces of said light guiding plate; and
   - a reflector disposed behind at least said back major surface.

2. A backlight as in claim 1, wherein said front and back surfaces are parallel to one another forming a planar light guiding plate.

3. A backlight as in claim 1, wherein said front and back surfaces form a linear wedge.

4. A backlight as in claim 1, wherein said front and back surfaces are not parallel to one another.

5. A backlight as in claim 1, wherein the surface of the light guiding plate proximate to the display device is not parallel to the display device.

6. A backlight as in claim 1, wherein the surface of the light guiding plate proximate to the display device is parallel to the display device.

7. A backlight as in claim 1, wherein one of said surfaces has a first area that is inclined with respect to the other surface at a first angle, and a second area that is inclined with respect to the other surface at a second SMALLER angle.

8. A backlight as in claim 7, wherein said display device is disposed adjacent the non-inclined surface and opposite the second area.

9. A backlight as in claim 7, wherein said display device is disposed adjacent the inclined surface.

10. A backlight as in claim 3, wherein said non-parallel portion is planar.

11. A backlight as in claim 3, wherein said non-parallel portion is non-planar.

12. A backlight as in claim 3, wherein said non-parallel portion has a first area that is inclined with respect to the other surface at a first angle, and a second area that is inclined with respect to the other surface at a second angle.

13. A backlight as in claim 12, wherein the angle of inclination of the second area is smaller that the angle of inclination of the first area.

14. A backlight as in claim 3, wherein said display device is disposed adjacent the non-inclined surface, and opposite the non-parallel portion.

15. A backlight as in claim 1, wherein said light source is a monochromatic LED.

16. A backlight as in claim 1, wherein said light source produces a plurality of colors.

17. A backlight as in claim 1, wherein said light source is a cold cathode fluorescent tube type light.

18. A backlight as in claim 1, wherein said light source is disposed in a recess formed in an edge of said light guiding plate.

19. A backlight as in claim 1, further including a focon disposed between said light source and said light guiding plate.

20. A backlight for a display device comprising:
   a light guiding plate having at least one edge, a first major surface and a second major surface, said first major surface being disposed proximate to said display device, and wherein said second major surface of said light guiding plate forms a doubly curved wedge light guiding plate;
   at least one light emitting diode coupled to an edge portion of said light guiding plate;
   a light extraction means disposed along at least said second major surface of said light guiding plate; and
   a reflector disposed behind at least said second major surface.

21. A backlight as in claim 20, wherein said light guiding plate has a first portion wherein the front and back surfaces are parallel and a second portion wherein said first and second surfaces are not parallel.

22. A backlight as in claim 16, wherein the surface proximate to the display device is not parallel to the display device.

23. A backlight as in claim 20, wherein the surface proximate to the display device is parallel to the display device.

24. A backlight as in claim 20, wherein at least one of said surfaces is non-planar.

25. A backlight as in claim 20, wherein one of said surfaces has a first area that is inclined with respect to the other surface at a first angle, and a second area that is inclined with respect to the other surface at a second angle.

26. A backlight as in claim 25, wherein said display device is disposed adjacent the non-inclined surface and opposite the second area.

27. A backlight as in claim 21, wherein said non-parallel portion is planar.

28. A backlight as in claim 21, wherein said non-parallel portion is non-planar.

29. A backlight as in claim 21, wherein said non-parallel portion has a first area that is inclined with respect to the other surface at a first angle, and a second area that is inclined with respect to the other surface at a second angle.

30. A backlight as in claim 21, wherein said display device is disposed adjacent the non-inclined surface, and opposite the non-parallel portion.

31. A backlight as in claim 20, wherein said light emitting diode is disposed in a recess formed in an edge of said light guiding plate.

32. A backlight as in claim 20, further including a focon disposed between said light source and said light guiding plate.

33. A flat illumination device (FID), having at least one illumination window defined over at least one plane, comprising:
   a light guiding plate, having two major faces at least one of which is planar and one of which is non-planar and at least two edges, and wherein one of said major surfaces of said light guiding plate forms a doubly curved wedge light guiding plate;
   at least one light source, each operative and disposed so as to couple a respective input luminous flux into any one of said edges;
   each input luminous flux forming a corresponding internal flux component which propagates through said plate by internal reflection;
   wherein, for any non-planar face of said plate, the distance from any point on the face to said second major face varies over the face as a function of a distance from said point to at least two edges of said plate, so as to effect any specified distribution of luminous emittance over at least one illumination window.

34. A flat illumination device as in claim 33, wherein a thickness of the light guiding plate is a non-linear monotonically decreasing function of the distance between the respective point and the corresponding flux-coupled edge, as projected onto said given plane.

35. A flat illumination device as in claim 33, wherein said dimension is a product of two different non-linear monotonically decreasing functions of the distance between the position of the respective point and at least two corresponding flux-coupling edges along any two orthogonal dimensions of said plane, as projected onto said given plane.

36. A flat illumination device as in claim 33, wherein said face forms a smooth concave surface with variable negative tilt and variable curvature which has different values in two principal planes (X,Y) and the flux coupling edges of a constant thickness.

37. A flat illumination device as in claim 33, wherein the outline of each face of said plate may have any geometric shape and said edges are formed correspondingly.

38. A flat illumination device as in claim 33, wherein the input luminous flux of any of said light sources is coupled to the corresponding edge over only a fraction of the edge's length.

39. A flat illumination device as in claim 33, wherein both faces of said plate are non-planar.

40. A backlight as in claim 1, wherein a first portion of the back major surface is parallel to said front major surface and a second portion of said back major surface is not parallel to said first major surface.

* * * * *